(12) United States Patent
Utsunomiya

(10) Patent No.: US 6,738,228 B2
(45) Date of Patent: May 18, 2004

(54) MAGNETIC HEAD POSITIONER ASSEMBLY

(75) Inventor: Motoyasu Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 166 days.

(21) Appl. No.: 09/756,882

(22) Filed: Jan. 10, 2001

(65) Prior Publication Data
US 2002/0018321 A1 Feb. 14, 2002

(30) Foreign Application Priority Data
Jan. 12, 2000 (JP) .......................... 2000-003491

(51) Int. Cl.$^7$ .............................. G11B 5/50; G11B 21/26
(52) U.S. Cl. .................................................. 360/265.7
(58) Field of Search ...................................... 360/265.7

(56) References Cited

U.S. PATENT DOCUMENTS

| | | | | |
|---|---|---|---|---|
| 5,621,590 A | * | 4/1997 | Pace et al. | 360/265.7 |
| 5,650,896 A | * | 7/1997 | Viskochil | 360/265.7 |
| 5,844,754 A | * | 12/1998 | Stefansky et al. | 360/265.8 |
| 5,862,019 A | * | 1/1999 | Larson | 360/265.8 |
| 5,898,544 A | * | 4/1999 | Krinke et al. | 360/104 |
| 6,185,075 B1 | * | 2/2001 | Tsujino et al. | 360/265.7 |
| 6,188,548 B1 | * | 2/2001 | Khan et al. | 360/294.4 |
| 6,236,544 B1 | * | 5/2001 | Hirokawa et al. | 360/265.7 |
| 6,239,953 B1 | * | 5/2001 | Mei | 360/294.4 |
| 6,320,730 B1 | * | 11/2001 | Stefansky et al. | 360/294.4 |

FOREIGN PATENT DOCUMENTS

| | | |
|---|---|---|
| JP | 59-218666 | 12/1984 |
| JP | 60-40071 U | 3/1985 |
| JP | 3-147580 | 6/1991 |
| JP | 5-43356 U | 6/1993 |
| JP | 8-329627 | 12/1996 |
| JP | 9-509000 A | 9/1997 |
| JP | 11-31368 A | 2/1999 |
| JP | 2000-182341 | 6/2000 |

* cited by examiner

Primary Examiner—George J. Letscher
Assistant Examiner—Christopher R Beacham
(74) Attorney, Agent, or Firm—Sughrue Mion, PLLC

(57) ABSTRACT

A magnetic head positioner assembly comprises a plurality of magnetic head support members individually provided with magnetic heads, an arm, and a movable coil which is held by the movable coil support portion provided for the arm and which is provided to drive the arm. The arm has a plurality of holder arms for individually supporting each of the magnetic head support members and a rotatable bearing portion or the center of driving each of the holder arms. Moreover, the rotatable bearing portion and two holder arms are integrated with each other into an arm unit. The aforementioned arm is formed by combining and bonding at least two arm units with each other being spaced by a predetermined spacing.

9 Claims, 26 Drawing Sheets

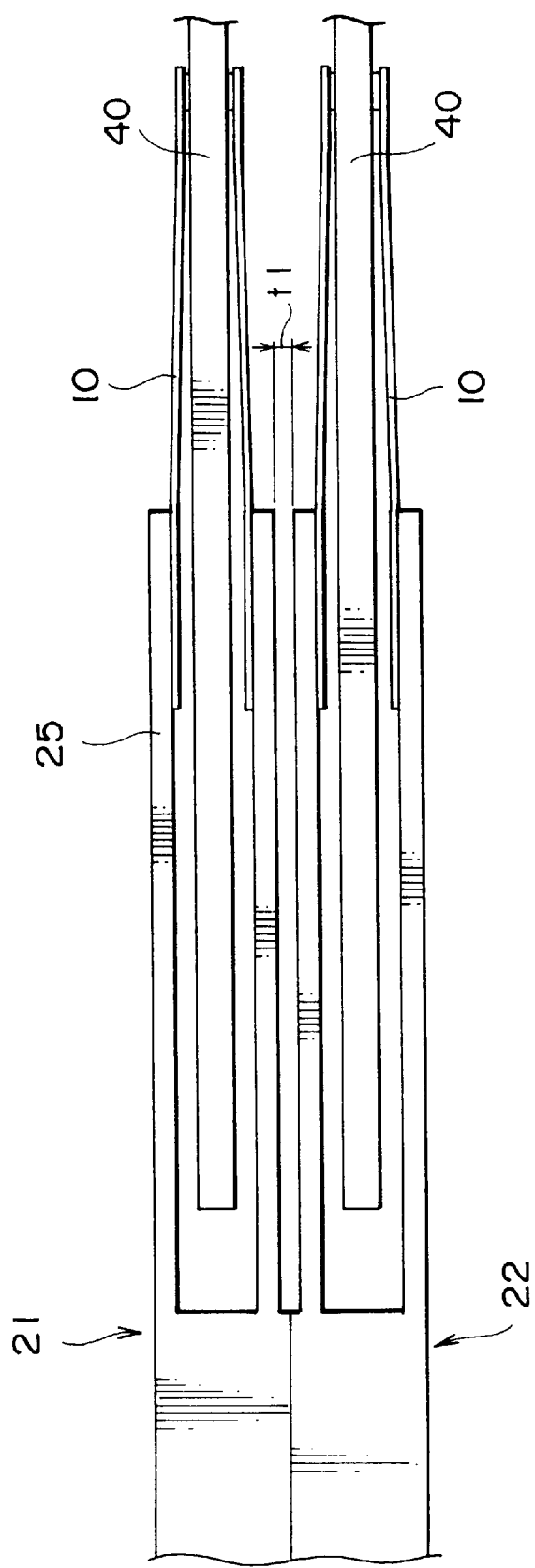

FIG. 16
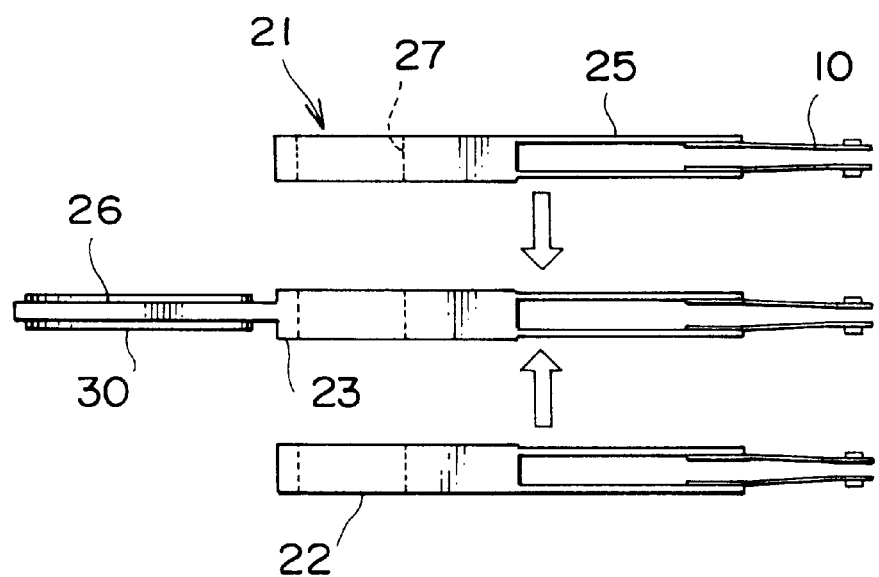
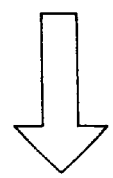
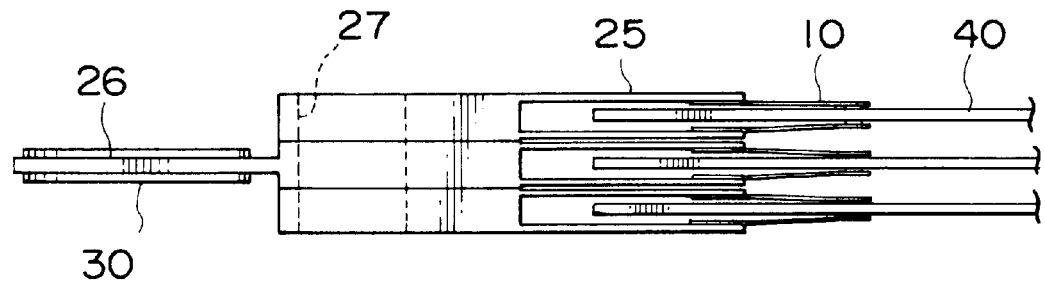

MAGNETIC HEAD POSITIONER ASSEMBLY

BACKGROUND OF THE INVENTION

1. Field of the Invention

The present invention relates to magnetic head positioner assembly for use in disk storage systems such as magnetic or optical disk storage systems.

2. Description of the Related Art

The density of storage of data in magnetic disk units are now increasing at an annual rate of 60% or more due to an improvement in BPI (Bit Per Inch) and TPI (Track Per Inch).

To realize a higher BPI, required are a reduction in height at which magnetic heads fly over the disk surface, the employment of highly sensitive heads, and highly efficient signal processing techniques. To realize a higher TPI, a technique for positioning magnetic heads with high accuracy is inevitable in addition to the foregoing.

For example, a density of storage of data of 0.155 Gb/cm$^2$ (1 Gb/in$^2$) provides densities of 8 kTPI or less in the direction of tracks or track pitches of 3 to 4 $\mu$m. To realize a density of storage of data of 1.55 Gb/cm$^2$ (10 Gb/in$^2$) or greater, track densities of 25 kTPI or greater or track pitches of 1 $\mu$m or less are required. This in turn requires an accuracy of positioning of magnetic heads on the disks of 0.1 $\mu$m or less (which is approximately equal to 10% of a track pitch).

FIG. 1 is a perspective view showing a conventional magnetic head positioner assembly. In addition, FIG. 2 is an exploded perspective view showing the arrangement of the conventional magnetic head positioner assembly. Moreover, FIGS. 3A and 3B are plan and perspective views showing a magnetic head support member of the conventional magnetic head positioner assembly, respectively.

As shown in FIG. 1, the conventional magnetic head positioner assembly comprises magnetic head support members 510, an arm 520 for holding the magnetic head support members 510, and a movable coil 530 provided at the arm 520.

As shown in FIGS. 2, 3A, and 3B, the magnetic head support member 510 comprises a slider 512 of a floating or a contact type to which a magnetic head 511 is mounted, a gimbal spring 513 for supporting the slider 512, and a load beam 514 for providing a predetermined push load for the slider 512. In addition, the magnetic head support member 510 is fitted into a magnetic head support member mounting hole 528 provided on a holder arm 525 of the arm 520, via a boss 515a provided on a base plate 515.

FIG. 4 is a plan view showing the main portion of a conventional disk storage system. As shown in FIG. 4, a plurality of holder arms 525 which support the magnetic head support members 510 are integrated with the arm 520 at the proximal end thereof and mounted rotatably into the magnetic disk storage system via a rotatable bearing portion 527 provided on the arm 520.

At the end portion of the arm 520, there is formed a movable coil support portion 529 and the movable coil 530 is provided on the movable coil support portion 529. Moreover, the movable coil 530 and an external stationary magnetic circuit 560 on the side of the magnetic disk storage system constitute a voice coil motor (hereinafter referred to as the VCM). The VCM applies a predetermined drive current to the movable coil 530 and thereby generates a drive force to rotationally drive the arm 520 or the magnetic head support members 510 along a circular arc path in the direction of a seek operation (in the radial direction of the disks). This allows the positioning operation of the magnetic heads 511 to target tracks on the disks (the rotary actuator scheme).

Incidentally, the positioning operation mentioned above is divided into a seek operation (tracking) for moving the magnetic head 511 from the position of an arbitrary track to that of a target track and a follow operation (following) for allowing the magnetic head 511 to remain on the target track.

The magnetic heads 511 are prepared according to the number of recording media. In addition, each magnetic head support member 510 for individually supporting each magnetic head 511 is also swaged to each of the holder arms 525 according to the number of the magnetic heads 511. For example, two recording media provide four data recording surfaces on the both surfaces of the media. In this case, a total of four magnetic head support members 510 is swaged to the holder arms 525, respectively.

FIG. 5 is a side view showing the entire conventional magnetic head positioner assembly. FIG. 6 is an enlarged side view showing the region shown by P3 of FIG. 3. In the case where two recording media are available, the arm 520 comprises three holder arms 525 as shown in FIGS. 5 and 6. One magnetic head support member 510 is mounted to each of the holder arms 525a, 525a at the both ends of the stack of the holder arms 525. On the other hand, two magnetic head support members 510 are mounted to the middle holder arm 525b sandwiched by the two recording media 40 with each of the arm 520 being arranged to be opposite to each of the associated data recording surfaces of the recording media.

In addition, the conventional magnetic head positioner assembly is adapted to drive a plurality of magnetic heads 511 with one VCM at the same time. This provides insufficient positioning accuracy and particularly inaccurate tracking during a follow operation. Thus, as described above, this is making it difficult for the conventional magnetic head positioner assembly to cope with a high TPI system which requires a magnetic head positioning accuracy of 0.1 $\mu$m or less.

Moreover, consider the case where a plurality of recording media are incorporated into a disk storage system to provide an increased capacity therefor. In this case, one magnetic head support member 510 is connected to each of the holder arms 525a, 525a at the both ends of the stack of the holder arms 525. In contrast, the middle holder arm 525b sandwiched by the recording media is connected with two magnetic head support members 510, 510. This will cause a difference in mass between the holder arms 525a and 525b, thereby presenting a problem of providing different vibration characteristics between the magnetic heads 511a, 511d at the both ends of the stack and the magnetic heads 511b, 511c at the middle portion of the stack.

This is conceivably resulted from a difference in mass caused by a difference in number of HGA (Head Gimbal Assembly) connected to the holder arms 525a, 525a located at the both ends of the stack and the middle holder arm 525b located at the middle portion of the stack. To improve this, it is commonly implemented to provide a dummy mass equivalent to the mass of the HGA for the holder arms 525a, 525a located at the both ends of the stack, thereby providing the same frequency characteristics for each of the magnetic heads. However, this allows the drive portion (the edge portion of the arms) to be provided with an additional excessive mass (dummy mass), thus presenting a problem of narrowing a control band due to the lowering of a resonance frequency to a lower band.

In addition, in a system with a plurality of recording media being implemented therein, the number of holder arms would increase as the number of recording media increases, thereby making the shape of the arm integrated therewith more complicated. This makes it difficult to form the arm. Furthermore, for example, forming the arm by cutting would present a problem of producing a great amount of cuttings and reducing in yield.

SUMMARY OF THE INVENTION

It is an object of the present invention to provide a disk storage system having a plurality of recording media implemented therein with a magnetic head positioner assembly which is provided with good vibration characteristics by eliminating a difference in frequency characteristics among the magnetic heads and which provides good productivity.

A magnetic head positioner assembly according to a first aspect of the present invention comprises a plurality of magnetic head support members for individually supporting magnetic heads, an arm comprising at least two, and a movable coil provided to said arm. Each of said arm units has two holder arms for individually supporting each of said magnetic head support members so as to position said magnetic head opposite to surface of recording media and a rotatable bearing portion for serving as a drive center of each of said holder arms, said arm units are combined and bonded with each other so as to align said bearing portion of all of arm units with each other and hold a space between neighboring holder arms of neighboring arm units In the magnetic head positioner assembly according to the first aspect of the present invention, each of the holder arms to individually support the magnetic head support member. Thus, the equivalent mass of each magnetic head support member to be supported by the holder arms can be made uniform without an additional extra mass (a dummy mass). The head supporting rigidity can also be made uniform. Thus, this makes it possible to make the vibration characteristics uniform at the position of each of the magnetic heads.

Furthermore, the arm is split into arm units, each provided with two holder arms, to be combined and bonded therewith. Accordingly, the arm units can be formed individually, so that this arm provides more improved formation workability than an arm of an integrated type of which shape becomes complicated and therefore difficult to be formed with increasing number of recording media. In addition, this assures that the formation workability does not depend on the number of recording media (more specifically, the number of holder arms), thus providing a uniform formation workability while facilitating workability.

Furthermore, in this case, various types of arms can be constructed simply by setting a new combination of respective arm units according to the number of recording media. Thus, respective arm units of disk storage systems of various types can be shared and the cost for machining the various arms can be reduced. That is, fluctuations in the number of recording media can be coped with readily at low cost. This makes it possible to achieve a reduction in cost of various disk storage systems.

A magnetic head positioner assembly according to a second aspect of the present invention is the first magnetic head positioner assembly further comprises a plurality of fine actuators individually supported to each of said holder arm, each of said fine actuators comprising an actuator spring connected to said holder arm and a pair of piezoelectric devices for driving individually and infinitesimally said magnetic head support member.

In the magnetic head positioner assembly according to the second aspect of the present invention, functions equally as the first magnetic head positioner assembly. In addition, each of the holder arms supports individually each of the fine actuators. Thus, it is possible to make uniform the equivalent mass of each of the fine actuators supported by each of the holder arms without an additional extra mass (a dummy mass), and to keep uniform the head supporting rigidity. This thereby makes it possible to make uniform the vibration characteristics at the position of each of the magnetic heads in a magnetic head positioner assembly of the two stage actuator type.

A magnetic head positioner assembly according to a third aspect of the present invention is the second magnetic head positioner assembly further comprising said holder arms each being provided with the same portion in shape as the proximal portion of each of the actuator springs, with each of the holder arms and each of the fine actuators being bonded with each other at this same portion in shape.

In the magnetic head positioner assembly according to the third aspect of the present invention, functions equally as the second magnetic head positioner assembly. In addition, with a sufficient drive spacing being provided for the actuator springs, it is possible to provide the actuator springs with a vertical rigidity, a impact resistance, and durability at the time of loading/unloading. That is, a vertical rigidity can be assured at the magnetic head support member.

A magnetic head positioner assembly according to a fourth aspect of the present invention is one of the first to third magnetic head positioner assemblies in which number of said arm units is two, and each of said arm units has a movable coil support portion to support said movable coil at a portion opposite to said holder arm with respect to said bearing portion.

In the magnetic head positioner assembly according to the fourth aspect of the present invention, functions equally as one of the first to third magnetic head positioner assemblies. In addition, a movable coil (that is, a drive force generating source) can be provided at a plane orthogonal to the axial direction at the position of the rotational axis center of the arm. This makes it possible to apply the drive force uniformly to each of the holder arms and move each of the magnetic heads more positively in parallel to the surface of the recording media.

A magnetic head positioner assembly according to a fifth aspect of the present invention is one of the first to third magnetic head positioner assemblies in which number of said arm units is an odd number, and one of said arm unit has a movable coil support portion to support said movable coil at a portion opposite to said holder arm with respect to said bearing portion.

In the magnetic head positioner assembly according to the fifth aspect of the present invention, functions equally as one of the first to third magnetic head positioner assemblies. In addition, the movable coil support portion is formed only on the bonded portion of a pair of arm units, thereby making it possible to reduce the weight of the other arm unit by cutting off excessive weight of portions thereof having nothing to do with the strength and function of the arm. This allows the moment of inertial at the position of each of the magnetic heads to be reduced. Furthermore, for example, in a case of an even number of arm units (recording media), the pair of arm units having the movable coil support portion are arranged at center of the arm, thereby allowing the movable coil (that is, a drive force generating source) to be provided on a plane orthogonal to the axial direction at the position of the rotational axis center of the arm. This makes it possible to apply the drive force uniformly to each of the holder arms and move each of the magnetic heads more positively in parallel to the surface of the recording media.

A magnetic head positioner assembly according to a sixth aspect of the present invention is one of the first to third magnetic head positioner assemblies in which number of said arm units is an odd number, and one of said arm unit has a movable coil support portion to support said movable coil at a portion opposite to said holder arm with respect to said bearing portion.

In the magnetic head positioner assembly according to the sixth aspect of the present invention, functions equally as one of the first to third magnetic head positioner assemblies. In addition, the movable coil support portion is formed on one arm unit, thereby making it possible to reduce the weight of the other arm unit by cutting off excessive weight of portions thereof having nothing to do with the strength and function of the arm. This allows the moment of inertial at the position of each of the magnetic heads to be reduced. Furthermore, for example, in a case of an odd number of arm units (recording media), the one arm unit having the movable coil support portion is arranged at center of the arm, thereby allowing the movable coil (that is, a drive force generating source) to be provided on a plane orthogonal to the axial direction at the rotational axis center of the arm. This makes it possible to apply the drive force uniformly and move each of the magnetic heads more positively in parallel to the surface of the recording media.

A magnetic head positioner assembly according to a seventh aspect of the present invention is one of the first to sixth magnetic head positioner assemblies in which the two holder arms of each arm unit have each an arm base provided for the rotatable bearing portion and two arm plates bonded to the arm base and formed of a separate member of a thin plate.

In the magnetic head positioner assembly according to the seventh aspect of the present invention, functions equally as one of the first to sixth magnetic head positioner assemblies. In addition, the holder arm can be reduced in thickness and made higher in rigidity. That is, it is possible to provide the holder arms with an improved rigidity while reducing the thickness of the arm units or the arm, thus allowing the vibration characteristics at the position of the magnetic heads to be improved.

A magnetic head positioner assembly according to a eighth aspect of the present invention is the seventh magnetic head positioner assemblies in which said arm base has an edge portion on a recording medium side arranged in proximity of an outer periphery of the recording medium at a time of operation for service.

In the magnetic head positioner assembly according to the eighth aspect of the present invention, functions equally as the seventh magnetic head positioner assemblies. In addition, recording media can be implemented with a minimum necessary spacing being provided between the recording media and the arm (more specifically, the arm bases), thereby allowing the disk storage system to be reduced in size. Furthermore, it is also made possible to further reduce the disk storage system in size by shortening the distance between the edge portion of the arm base on the recording medium side and the center of rotation of the arm (more specifically, the arm base).

A magnetic head positioner assembly according to a ninth aspect of the present invention is one of the seventh and eighth magnetic head positioner assemblies in which the arm plates are each provided with through-holes.

In the magnetic head positioner assembly according to the ninth aspect of the present invention, functions equally as one of the seventh and eighth magnetic head positioner assemblies. In addition, the arm plate (holder arm) can be reduced in weight, that is, a decrease in rigidity of the arm plate can be prevented while the weight of inertia is being reduced at the time of operation for service. The vibration characteristics at the position of the magnetic heads can be thereby improved while the arm is kept reduced in thickness. Furthermore, the through-holes can be formed in the same process as the formation of the main body of the arm plate, thereby making it possible to realize a reduction in weight at low cost.

A magnetic head positioner assembly according to a tenth aspect of the present invention is one of the seventh and eighth magnetic head positioner assemblies in which the arm plates are less in thickness at a central portion thereof than at an outer rim portion.

In the magnetic head positioner assembly according to the tenth aspect of the present invention, functions equally as one of the seventh and eighth magnetic head positioner assemblies. In addition, the arm plate (holder arm) can be reduced in weight, that is, a decrease in rigidity of the arm plate can be prevented while the weight of inertia is being reduced at the time of operation for service. The vibration characteristics at the position of the magnetic heads can be thereby improved while the arm is kept reduced in thickness.

A magnetic head positioner assembly according to a eleventh aspect of the present invention is one of the seventh to tenth magnetic head positioner assemblies in which the arm plates are each provided with flange portions on the both end portions in the longitudinal direction thereof.

In the magnetic head positioner assembly according to the eleventh aspect of the present invention, functions equally as one of the seventh to tenth magnetic head positioner assemblies. In addition, the arm plate (holder arm) can be further improved in rigidity by providing the flanges thereto. Alternatively, the rigidity required can be assured while the arm plate is further reduced in thickness, thereby allowing the vibration characteristics at the position of the magnetic heads to be improved. Moreover, the arm plate (holder arm) reduced in weight can be prevented from being reduced in rigidity due to the reduction in weight or can be improved in rigidity. This allows the weight of inertia to be reduced at the time of operation for service and the rigidity to be improved as well, thereby making it possible to improve the vibration characteristics at the position of the magnetic heads.

A magnetic head positioner assembly according to a twelfth aspect of the present invention is one of the seventh to eleventh magnetic head positioner assemblies in which a boss provided on the arm plate and a mounting hole provided to the arm base allow the arm plate and the arm base to be fitted to each other.

In the magnetic head positioner assembly according to the twelfth aspect of the present invention, functions equally as one of the seventh to eleventh magnetic head positioner assemblies. In addition, the boss serves for positioning between the arm plate and the arm base, thus facilitating bonding therebetween. That is, dimensions can be easily controlled at the time of bonding the arm plate to the arm base, thereby allowing the assembling workability to be improved.

BRIEF DESCRIPTION OF THE DRAWINGS

FIG. 11 is an enlarged side view showing the region P1 of FIG. 14.

FIG. 16 is a side view showing the magnetic head positioner assembly of a modified example according to the first embodiment of the present invention.

DETAILED DESCRIPTION OF THE PREFERRED EMBODIMENT

A magnetic head positioner assembly according to the embodiments of the present invention will be specifically described below with reference to the accompanying drawings. First, a first embodiment according to the present invention will be explained with reference to FIGS. 7 to 11.

Figure 1:
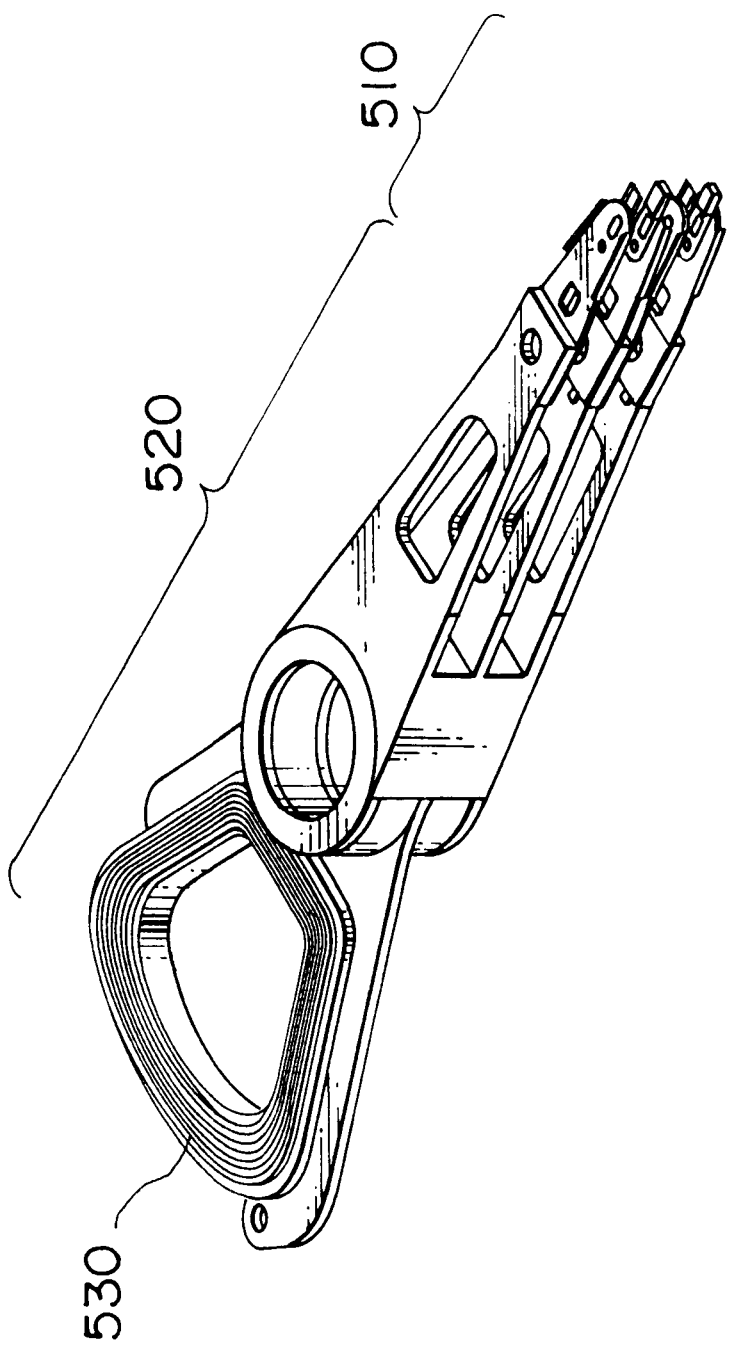
FIG. 1 is a perspective view showing a conventional magnetic head positioner assembly.
Figure 2:
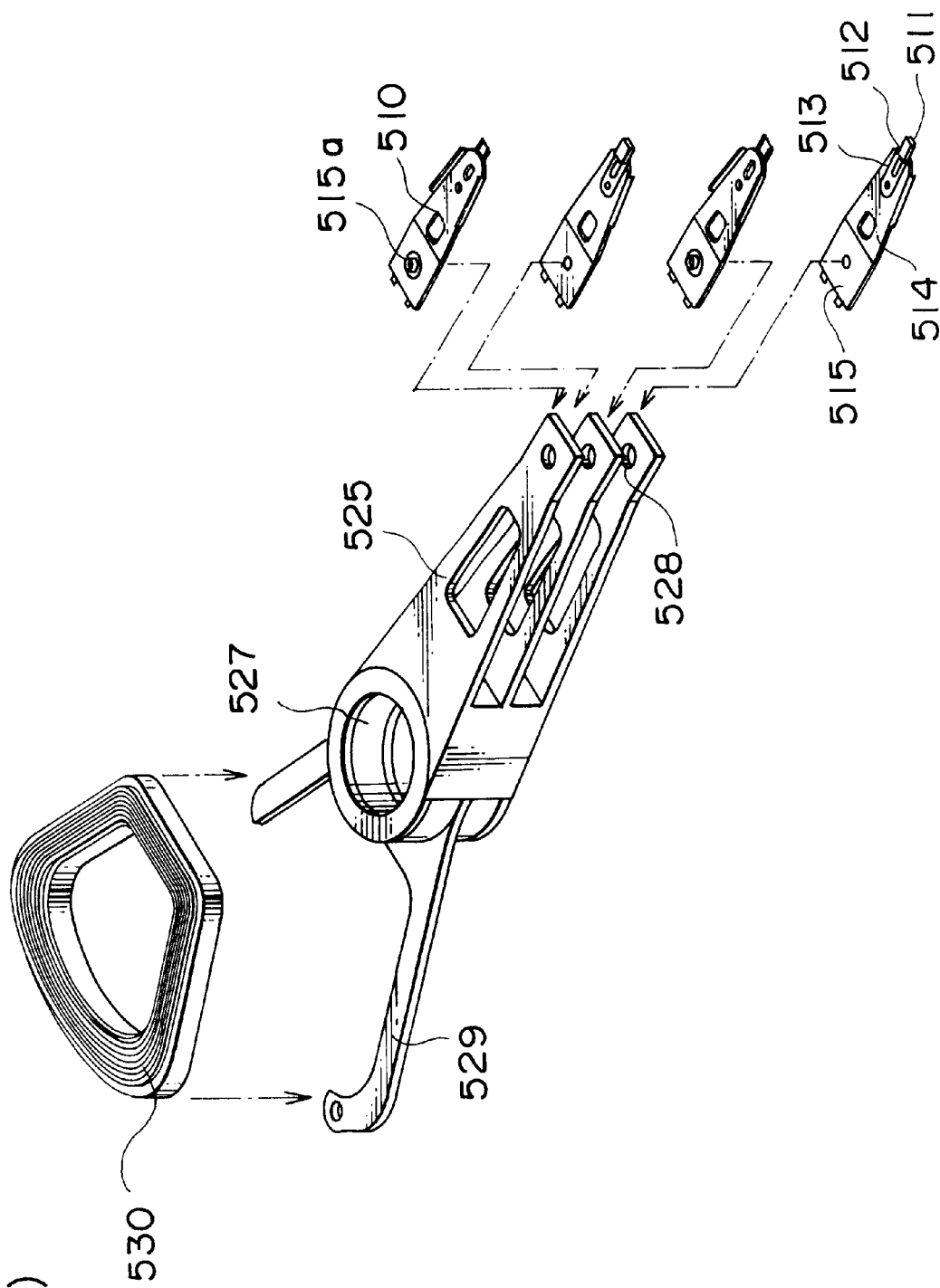
FIG. 2 is an exploded perspective view showing an arrangement of a conventional magnetic head positioner assembly.
Figure 3A:
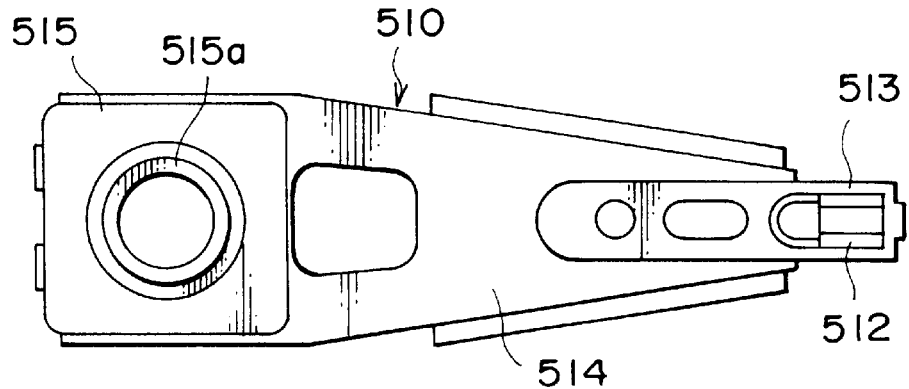
FIGS. 3A and 3B are views showing a conventional magnetic head positioner assembly, FIG. 3A being a plan view showing a magnetic head support member thereof and FIG. 3B being a perspective view showing the magnetic head support member.
Figure 3B:
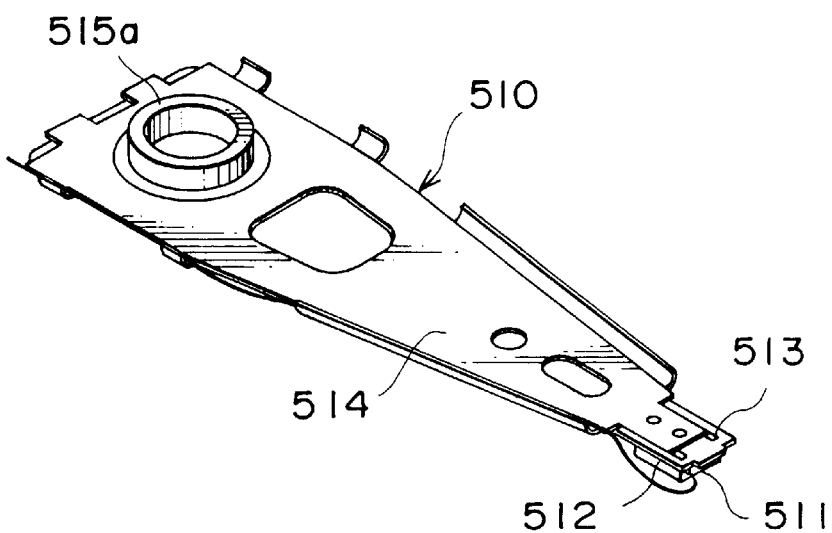
Figure 4:
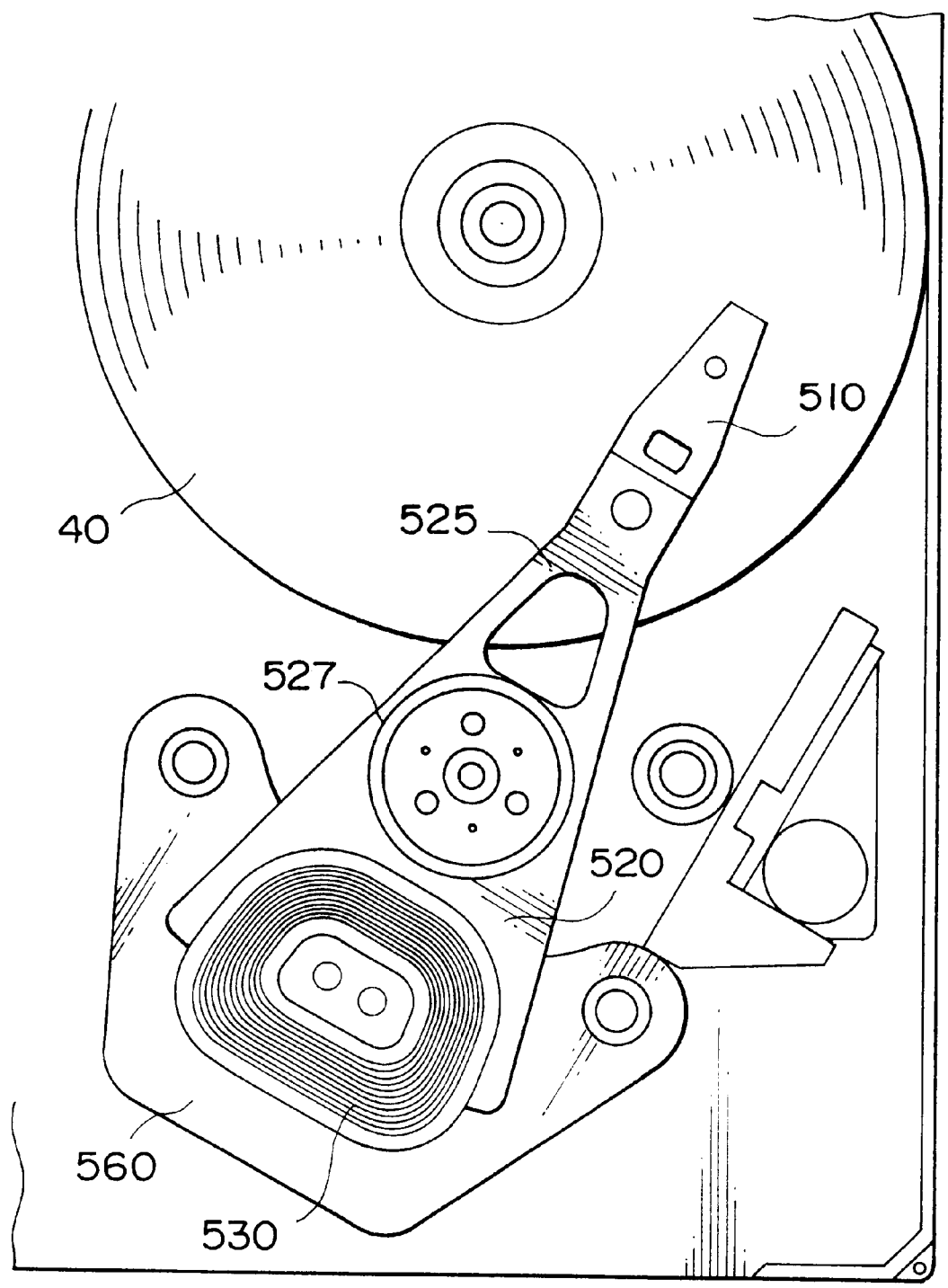
FIG. 4 is a plan view showing the main portion of a conventional disk storage system.
Figure 5:
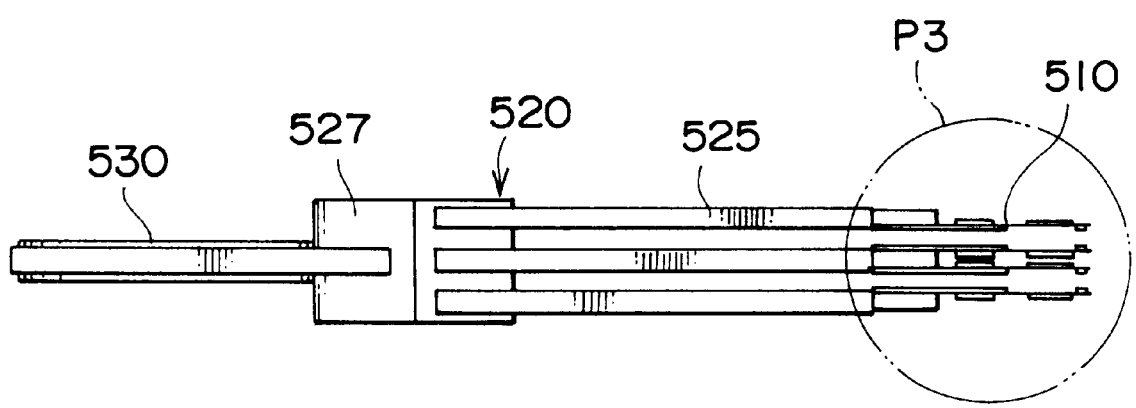
FIG. 5 is a side view showing the entire conventional magnetic head positioner assembly.
Figure 6:
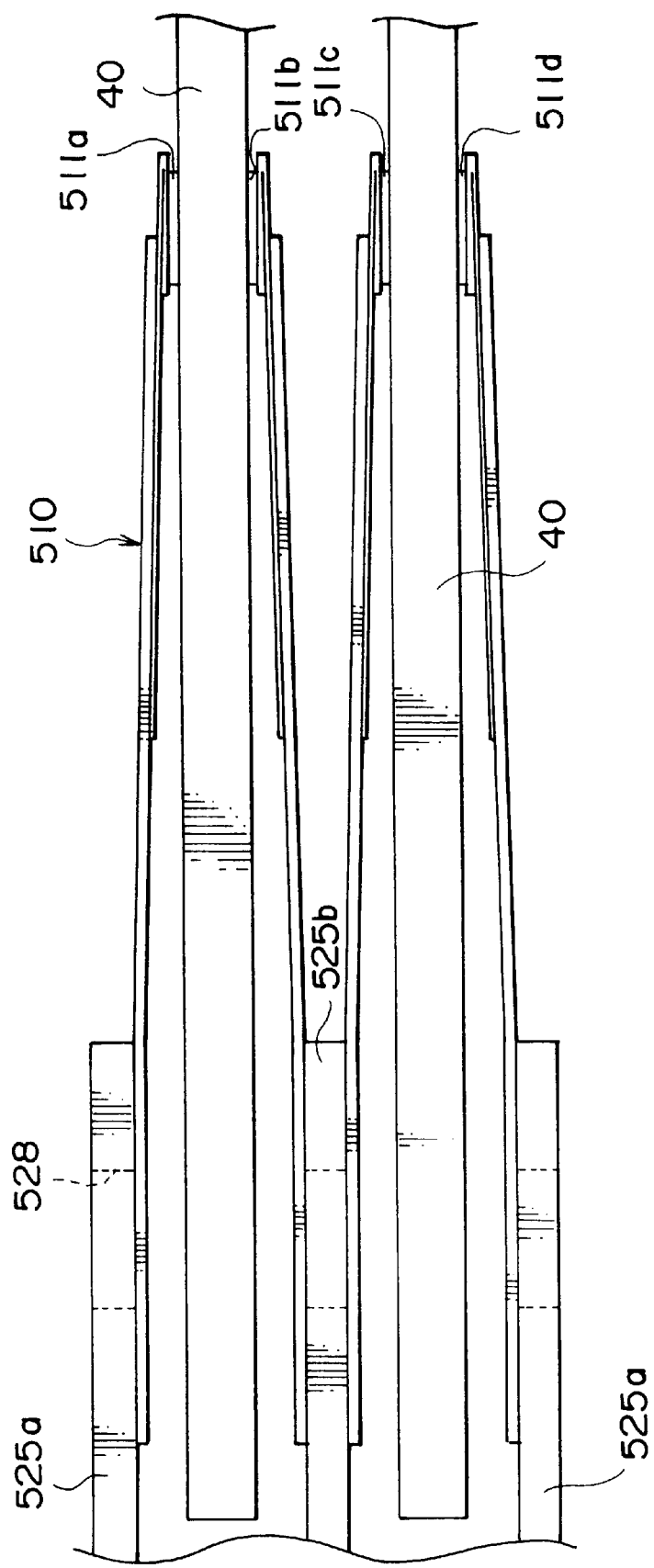
FIG. 6 is an enlarged side view showing the P3 region of FIG. 5.
Figure 7:
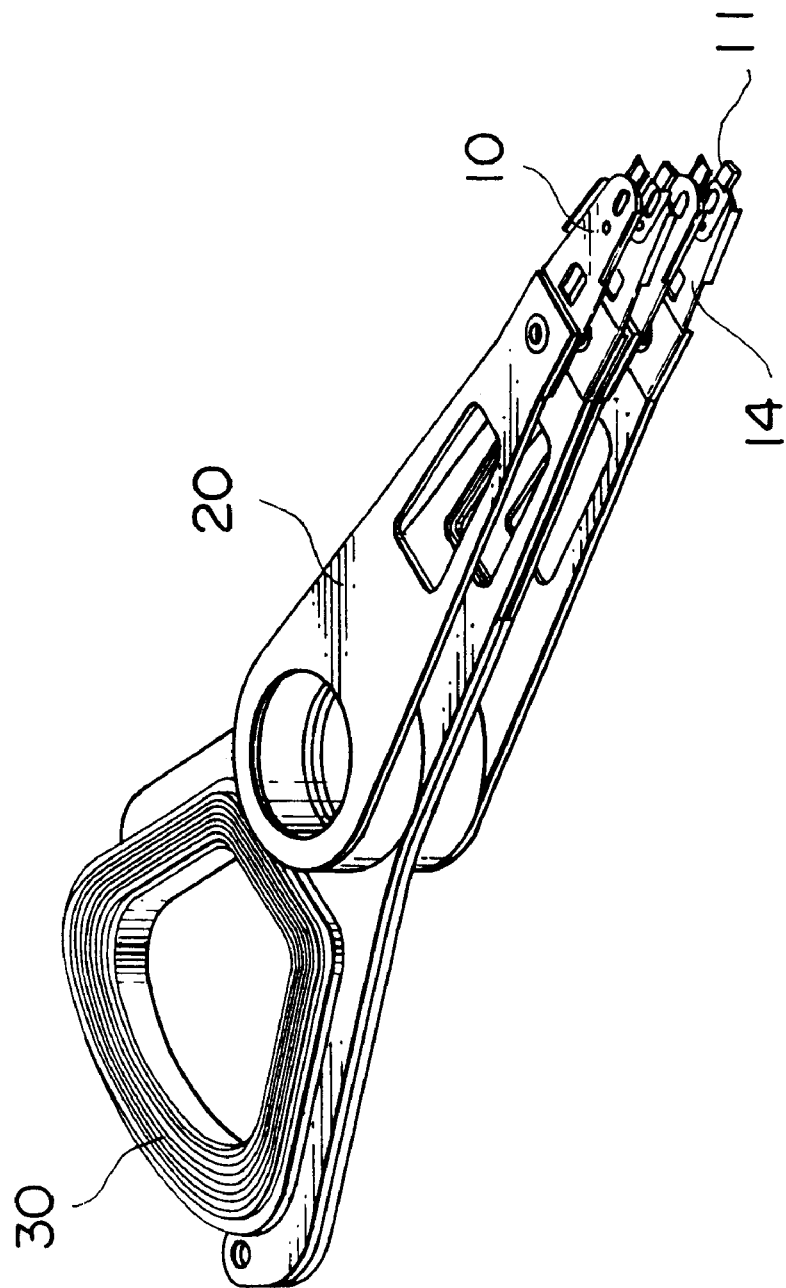
FIG. 7 is a perspective view showing a magnetic head positioner assembly according to a first embodiment of the present invention.

FIG. 7 is a perspective view showing a magnetic head positioner assembly according to the first embodiment of the present invention. In this embodiment, two recording media are implemented. This magnetic head positioner assembly comprises four magnetic head support members 10, an arm 20 for supporting each of the magnetic head support members 10, and a movable coil 30 provided in the arm 20. In addition, the same drive means by the VCM as the aforementioned conventional one is employed for the operation of positioning the magnetic heads in this embodiment.

Figure 8:
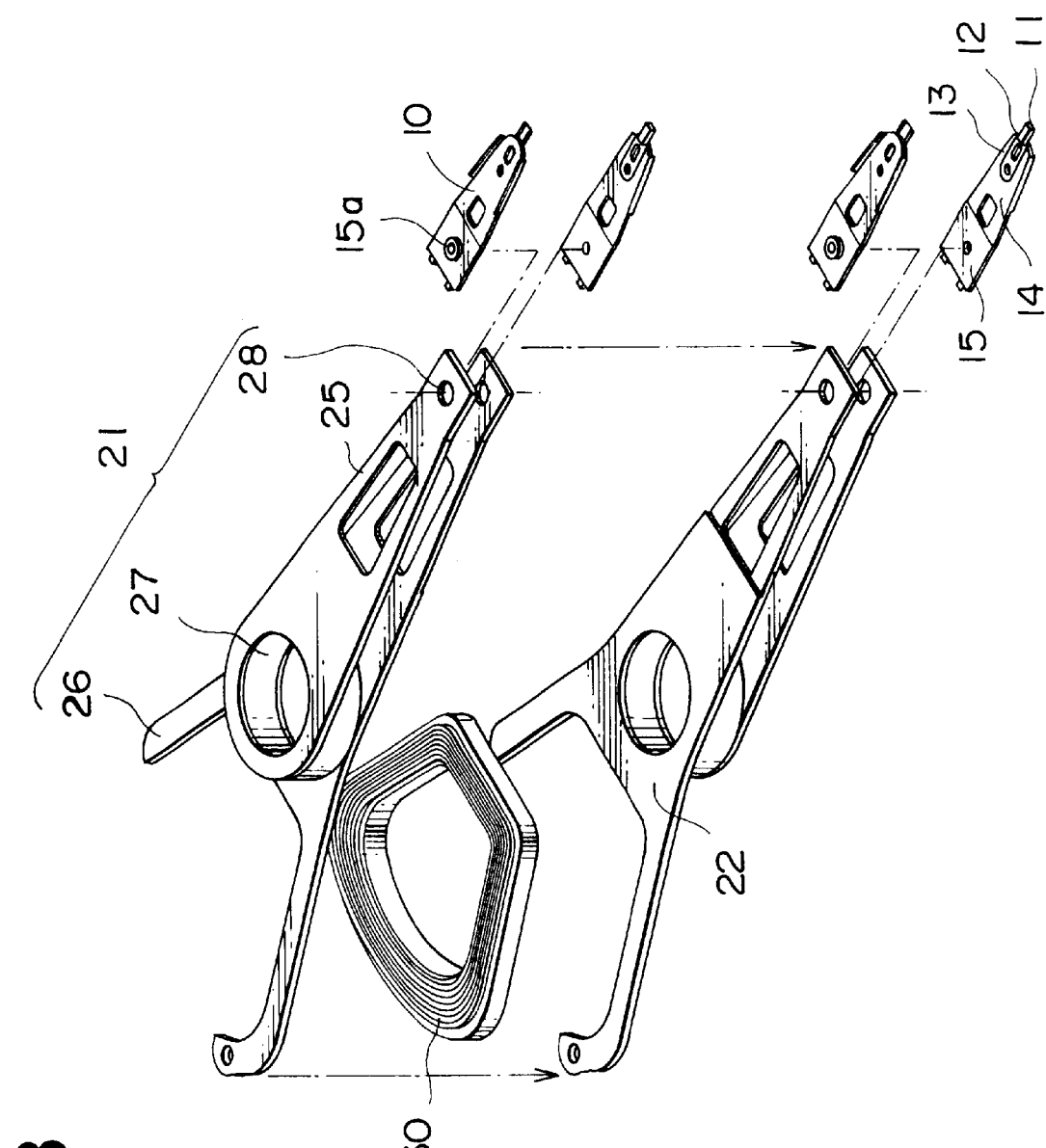
FIG. 8 is an exploded perspective view showing the arrangement of the magnetic head positioner assembly according to the first embodiment of the present invention.
Figure 9:
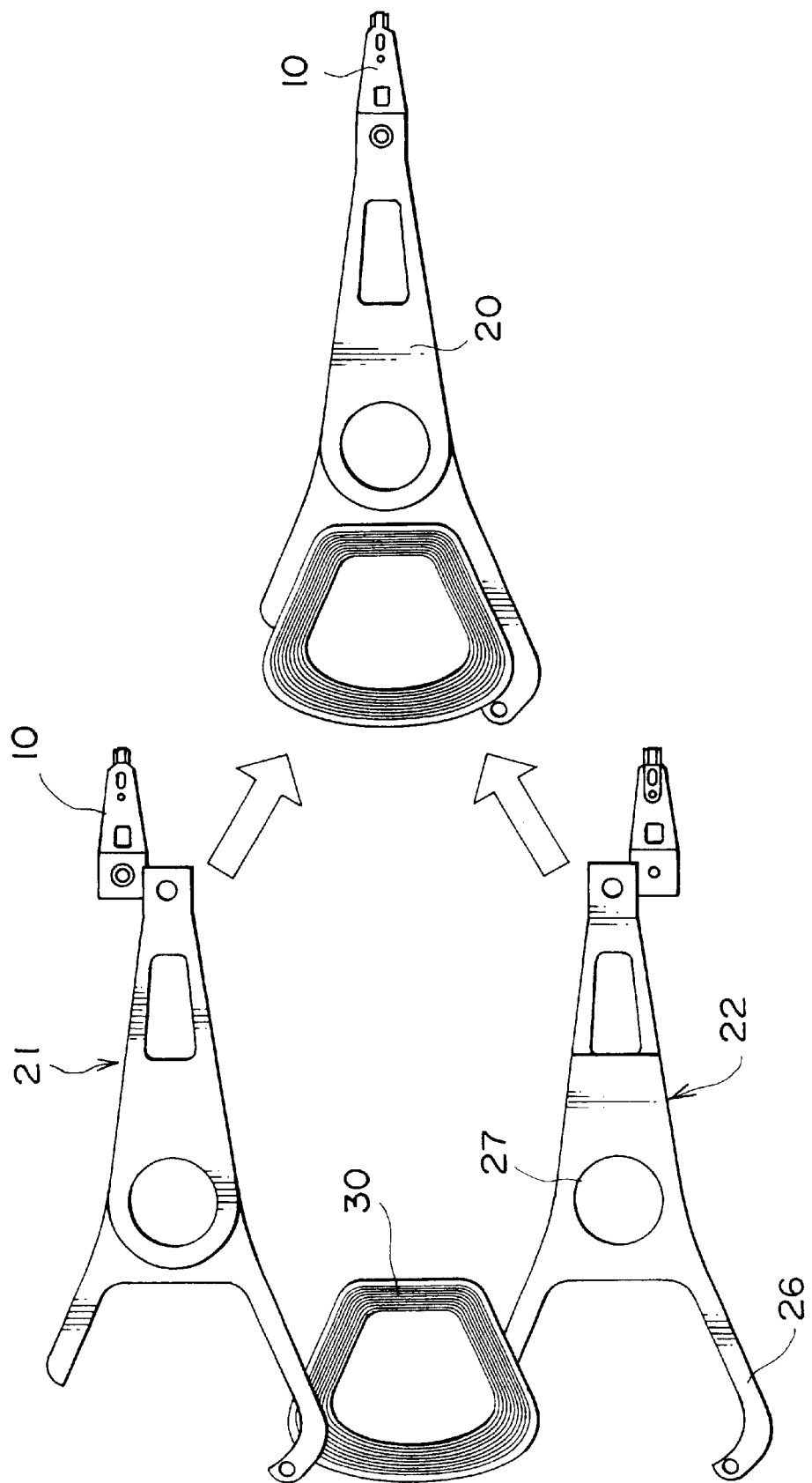
FIG. 9 is a plan view showing the magnetic head positioner assembly according to the first embodiment of the present invention.
Figure 10:
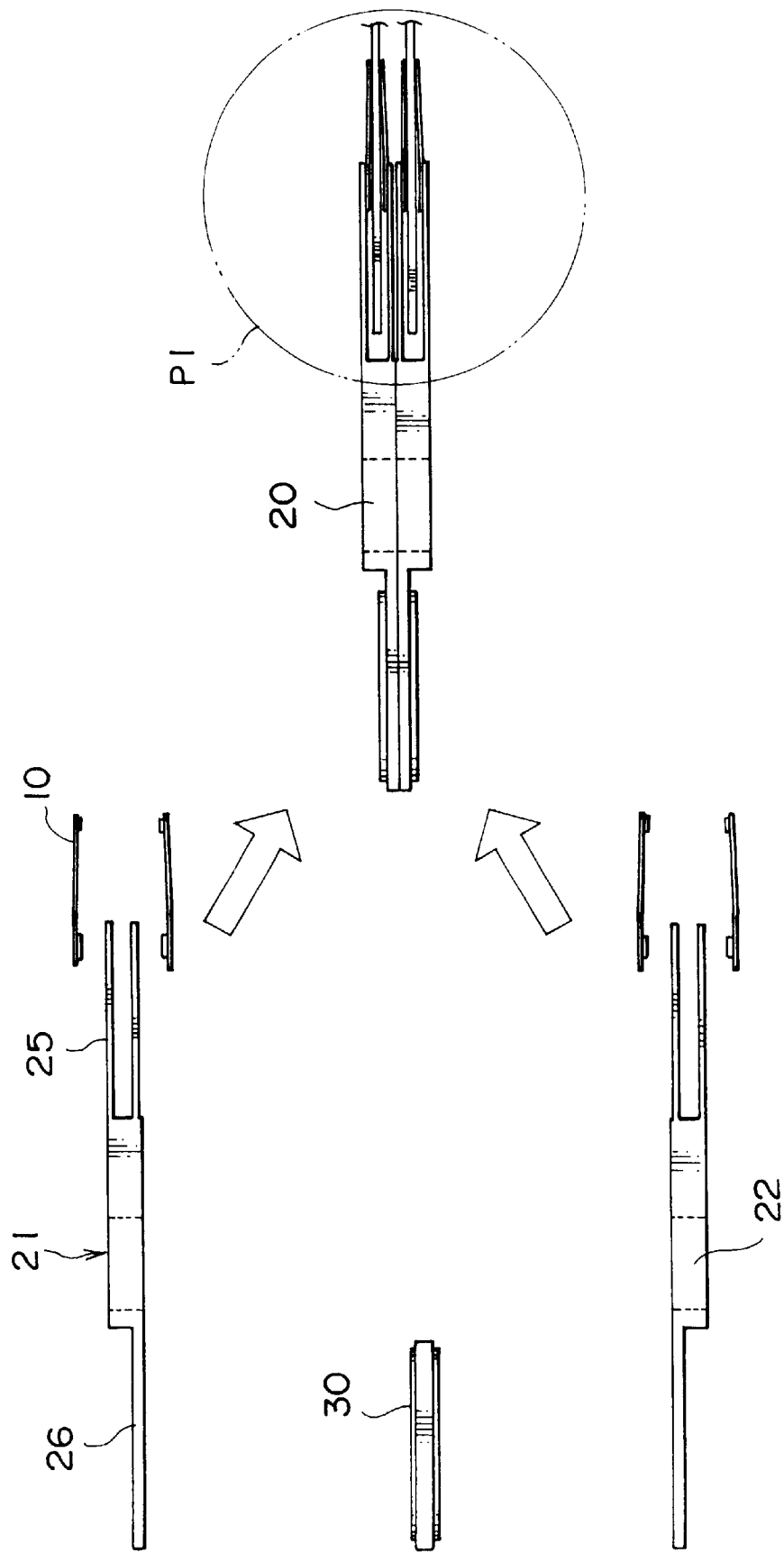
FIG. 10 is a side view showing the magnetic head positioner assembly according to the first embodiment of the present invention.

FIG. 8 is an exploded perspective view showing the arrangement of the magnetic head positioner assembly according to this embodiment. FIG. 9 is a plan view showing the magnetic head positioner assembly according to this embodiment. FIG. 10 is a side view showing the magnetic head positioner assembly according to this embodiment.

As shown in FIGS. 8, 9, and 10, the arm 20 has arm units 21, 22 in which integrated are two holder arms 25 for individually supporting the magnetic head support members 10, bobbins (movable coil retainer portions) 26 for retaining the movable coil 30, and a rotatable bearing portion 27. Moreover, the two arm units 21, 22 are combined with each other to constitute the arm 20. The arm units 21, 22 are bonded with each other to sandwich the movable coil 30 with the bobbins 26 provided to each of the arm units 21, 22.

In addition, one holder arm 25 having the bobbin 26 and the rotatable bearing portion 27, and another holder arm 25 having the rotatable bearing portion 27 may be combined with each other to form the arm units 21, 22, respectively. At this time, to bond the arm units 21, 22 with each other, an adhesive may be applied to the bonded surface of each of the arm units 21, 22 for their fixation.

Furthermore, each of the bobbins 26 may be provided with a frame to fixedly sandwich the movable coil 30 with the arm units 21, 22. Alternatively, an adhesive may be applied to the bonded surface between the movable coil 30 and the bobbins 26 for their fixation.

The holder arms 25 are preferably formed entirely in the same shape.

Now, referring to FIG. 8, each of the magnetic head support members 10 has a similar arrangement to the conventional example described in the foregoing. That is the magnetic head support member 10 comprises a slider 12 of a floating or a contact type to which a magnetic head 11 is mounted, a gimbal spring 13 for supporting the slider 12, and a load beam 14 for providing a predetermined push load for the slider 12. In addition, each of the magnetic head support members 10 is individually fitted into a magnetic head support mounting hole 28 provided on each of the holder arms 25 via a boss 15*a* provided on a base plate 15. Incidentally, the magnetic head support members 10 may be each bonded to each of the holder arms 25 in advance to thereafter combine and bond the arm units 21, 22 with each other. This makes it possible to provide an improved workability of attaching each of the magnetic head support members 10 to reduced spacing portions between the holder arms 25.

FIG. 11 is an enlarged side view showing the region P1 of FIG. 10. As shown in FIG. 11, the spacing between the holder arms 25 on the side of the bonded surface is advantageously made smaller for implementation between narrow plates when the arm units 21, 22 are bonded with each other. That is, this is advantageous to allow the recording media 40 to be spaced closer together and incorporated into the disk storage system in order to provide a reduced thickness for the disk storage system or reduce the thickness of the disk storage system with the number of the recording media 40 being increased. However, suppose that the magnetic head support members 10 each have to be held on the surface of the holder arms 25, opposite to that facing the recording surface of each of the associated recording media 40, that is, on the surface closer to the bonded surface of the arm units 21, 22 here. In this case, the spacing is desirably made large enough for the magnetic head support members 10 not to interfere with each other. That is, it is desirable to provide a predetermined spacing of t1 for each of the base plates 15.

Now, as a reference example for the present invention, a magnetic head positioner assembly of the two stage actuator type is explained below which is disclosed in Japanese Patent Laid-Open Publication No. 2000-182341 (hereinafter referred to as a reference example). As described in the foregoing, the conventional magnetic head positioner assembly was adapted to drive a plurality of magnetic heads 511 by one VCM at the same time and therefore provided insufficient positioning accuracy or particularly insufficient tracking accuracy in a follow operation. In contrast to the example like this, the reference example is a magnetic head positioner assembly of the two stage actuator type which drives individually each of the magnetic heads 511 independently of the driving of the arm 520 by the VCM and which thereby provides an improved accuracy of positioning of the magnetic heads. Incidentally, the date of publication of the reference example was Jun. 3, 2000, preceding the date claiming the priority right of the present application.

Figure 12A:
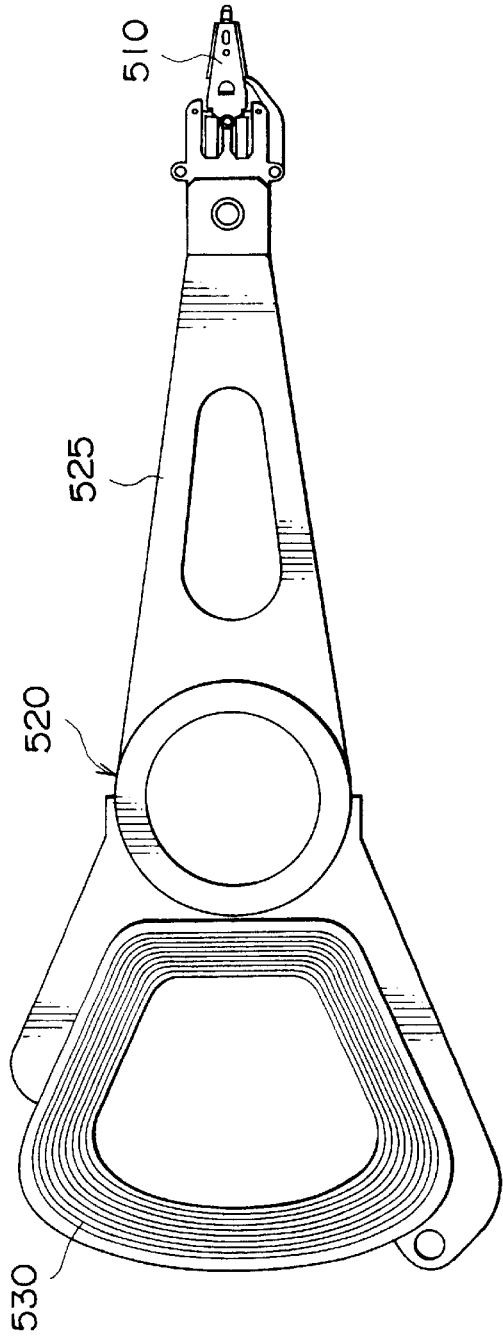
FIGS. 12A and 12B are views showing an entire magnetic head positioner assembly of a two stage actuator type according to a comparative example, FIG. 12A being a plan view thereof and FIG. 12B being a side view thereof.
Figure 12B:
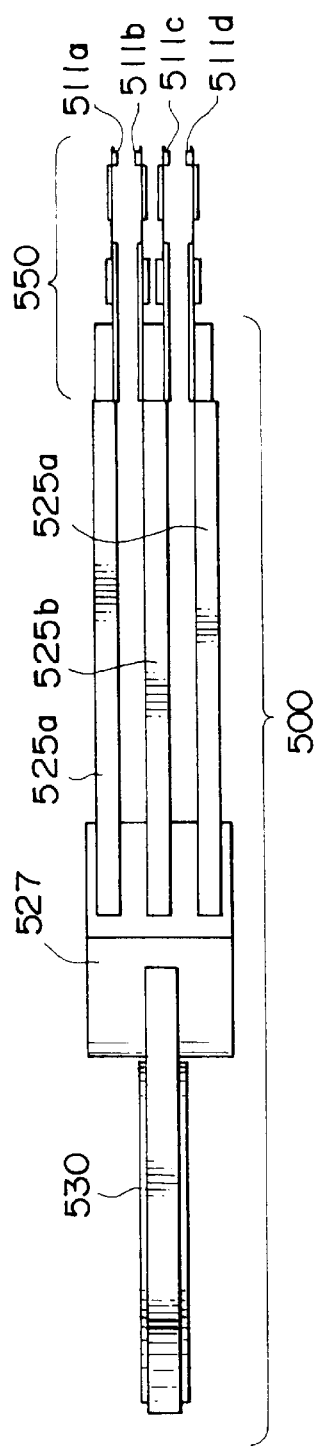

FIGS. 12A and 12B are a plan and side view showing an entire magnetic head positioner assembly of the two stage actuator type according to the reference example, respectively. Incidentally, in the reference example shown in FIGS. 12 to 14, the same components as those of the conventional example shown in FIGS. 1 to 6 are provided with the same reference numerals and will not be explained repeatedly in detail.

As shown in FIGS. 12A and 12B, the reference example is a two stage actuator of a HGA (Head Gimbal Assembly) drive type, which employs piezoelectric devices and comprises the magnetic head support members 510, fine actuators 550 including the magnetic head support members 510, and coarse actuator portion 500.

Figure 13A:
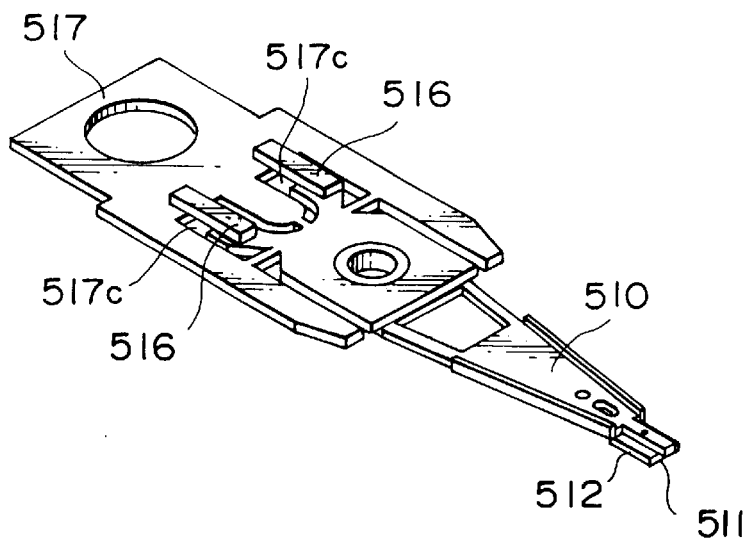
FIGS. 13A and 13B are views showing a fine actuator of the magnetic head positioner assembly of the two stage actuator type according to the comparative example, FIG. 13A being a perspective view thereof and FIG. 13B being a perspective view showing the arrangement of the parts of the fine actuator.
Figure 13B:
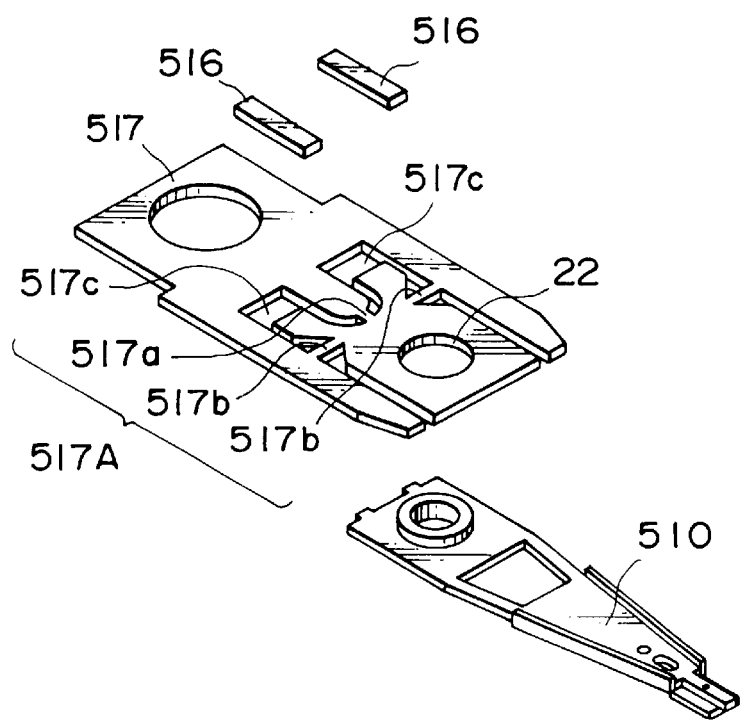
Figure 14A:
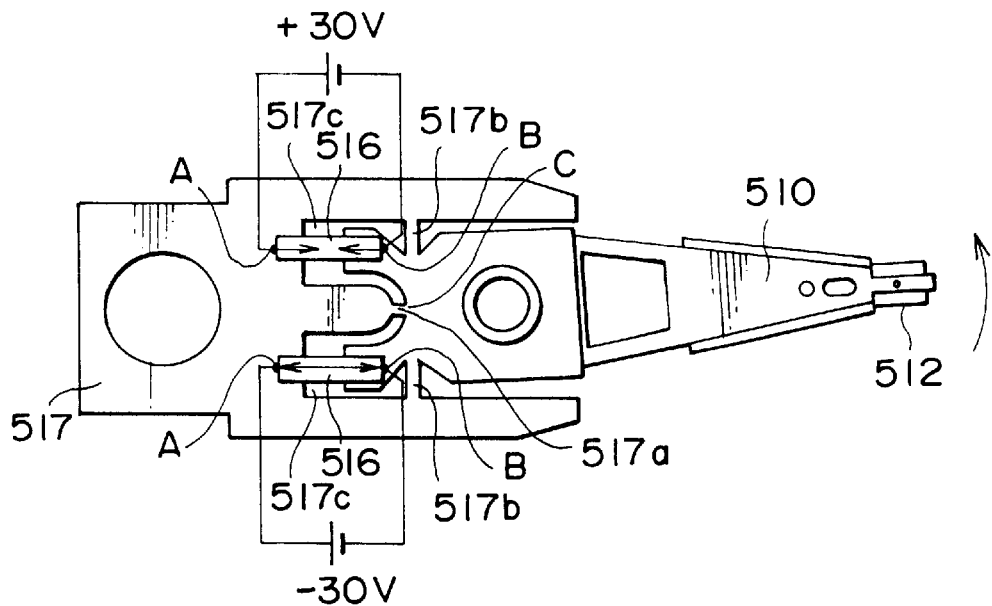
FIGS. 14A and 14B are views showing the magnetic head positioner assembly of the two stage actuator type according to the comparative example, FIG. 14A being an explanatory plan view showing the operation principle thereof in one direction, FIG. 14B being an explanatory plan view showing the operation principle thereof in the other direction.
Figure 14B:
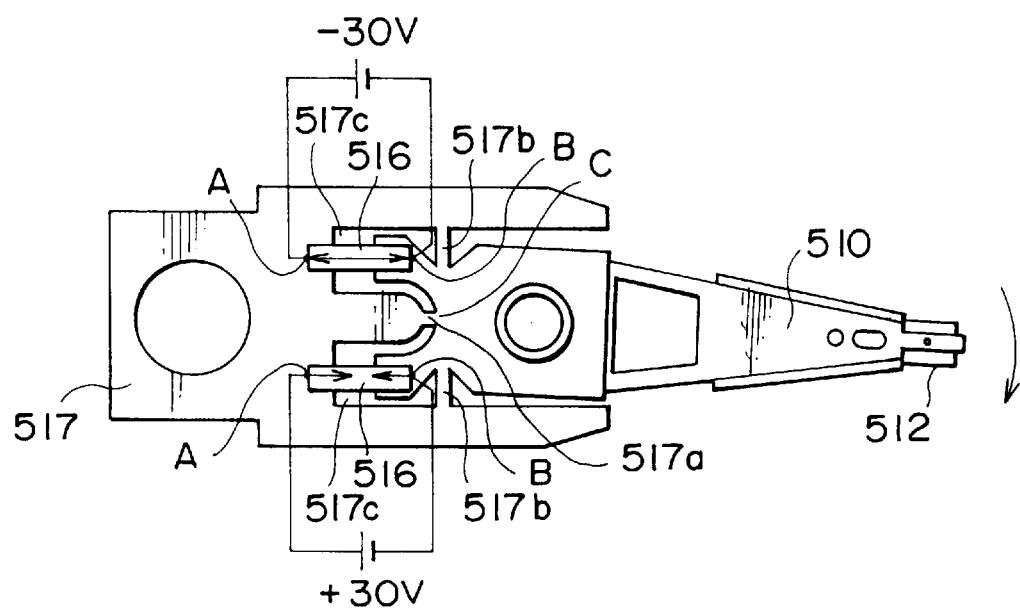
Figure 15A:
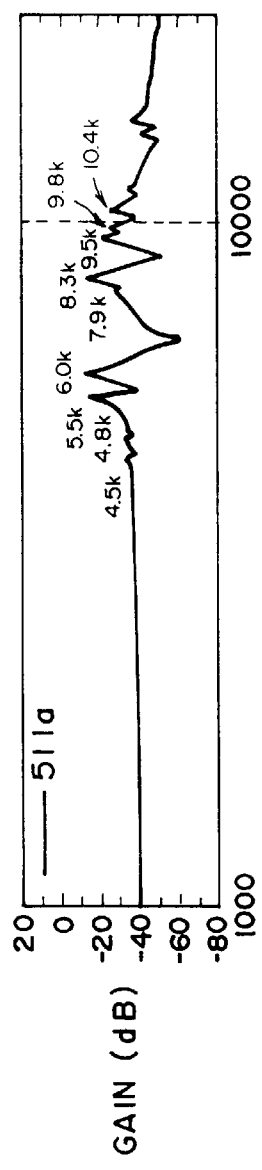
FIGS. 15A–15D are graphical representations of the results obtained from the simulation of frequency response provided by the magnetic heads 511*a*, 511*b*, 511*c*, 511*d*, which are incorporated into the magnetic head positioner assembly of the two stage actuator type according to the comparative example shown in FIG. 13.
Figure 15B:
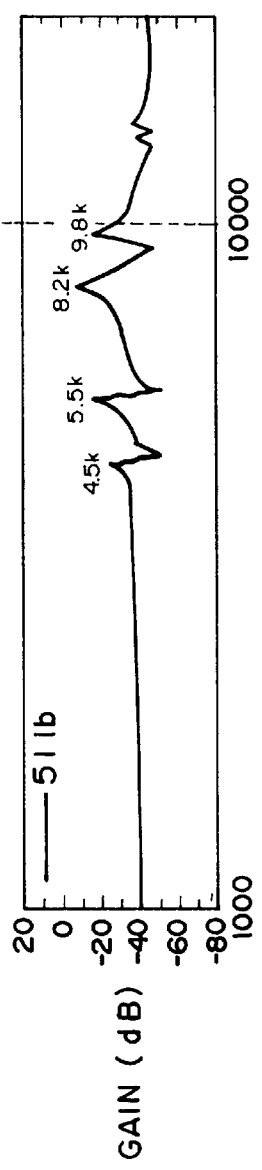
Figure 15C:
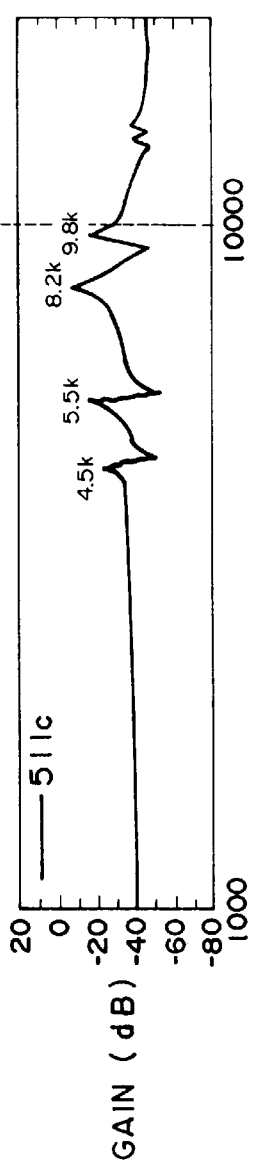
Figure 15D:
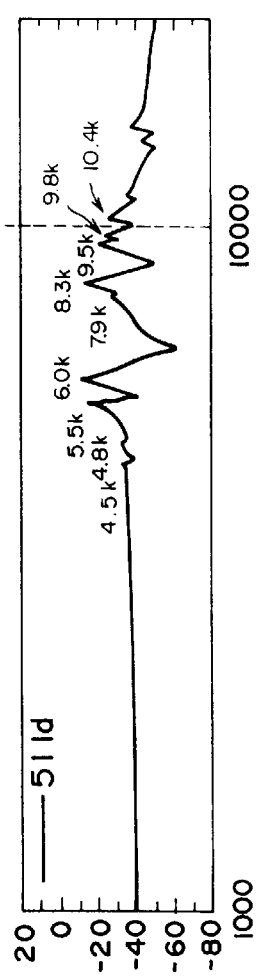

FIGS. 13A is a perspective view showing the fine actuator of the magnetic head positioner assembly of the two stage actuator type according to the reference example, while FIG. 13B is a perspective view showing the arrangement of the parts of the fine actuator. FIGS. 14A is a plan view showing the operation principle in one direction of the magnetic head positioner assembly of the two stage actuator type according to the reference example, while FIG. 14B is a plan view showing the operation principle in the other direction of the magnetic head positioner assembly of the two stage actuator type.

As shown in FIGS. 13A and 13B, the magnetic head positioner assembly of the two stage actuator type according to the reference example has the magnetic head support members 510 connected to or integrated with the end of an actuator spring 517. In addition, the proximal portion of the actuator spring 517 is adapted to be fixed to the holder arm 525. On the actuator spring 517, there are arranged a pair of piezoelectric devices 516, 516 in parallel to each other across the central axis of the actuator spring 517. With this arrangement, a predetermined voltage (for example, ±30V) is alternately applied to the piezoelectric devices 516, 516 to generate drive forces upon tracking. Then, as shown in FIGS. 14A and 14B, the drive force will cause a drive spring portion 517A (a center spring 517*a* and side springs 517*b*, 517*b*) provided on the actuator spring 517 to deflect to allow the magnetic head support members 510 to be drivingly rotated infinitesimally in the direction of tracks.

At this time, the piezoelectric devices 516, 516 allow the portion B on the magnetic head side to contract or expand across drive spacings 517*c*, 517*c* with the portion A on the holder arm side being fixed in order to deflect the two side springs 517*b*, 517*b*, thereby driving infinitesimally the magnetic head support members 510 rotatably about the portion C near the center spring 517*a*.

As such, it is being achieved to realize a positioning accuracy of 0.1 μm or less by switching (or combining) drive methods between tacking and follow operations, and thus a density of storage of data of 1.55 $Gb/cm^2$ (10 $Gb/in^2$) or greater (a track density of 25 kTPI or greater).

However, suppose that the two stage actuator is employed with the accuracy of positioning the magnetic heads having been improved. In this case, the HGA drive force provided by the piezoelectric devices 516, 516 turns to be a source of vibration to excite the holder arms 525 to vibrate. This will cause a difference in vibration characteristics to become more pronounced between the magnetic heads 511*a*, 511*d* at the both ends of the stack and the magnetic heads 511*b*, 511*c* at the middle portion of the stack.

FIGS. 15A to 15D are graphical representations of the results obtained from the simulation of the vibration characteristics (frequency response) measured at the position of each of the magnetic heads 511*a*, 511*b*, 511*c*, 511*d*, with the magnetic head positioner assembly of the two stage actuator type according to the comparative example being incorporated into the disk storage system. In FIG. 15A to 15D, the horizontal axis represents the frequency and the vertical axis represents the response amplitude at the position of each of the magnetic heads. In this simulation, such a disk storage system is exemplified to which two recording media are mounted.

As shown in FIGS. 15A to 15D, with each of the magnetic heads having different resonance frequencies, a plurality of notch filters or two types of filters must be prepared for the magnetic heads 511a, 511d at the both ends of the stack and for the magnetic heads 511b, 511c at the middle portion of the stack in the reference example. This makes the scale of the circuit more complicated and provides insufficient phase allowance, thus presenting a problem of degrading the accuracy of positioning the magnetic heads.

In contrast to the reference example like this, the magnetic head positioner assembly according to this embodiment allows the arm units 21, 22 to be formed individually and thereafter combined and bonded with each other in order to form the arm 20. As described above, this obviates the need for performing a complicated formation in order to form the integrated arm 520 complicated in shape like the conventional example or the reference example, thereby making it possible to provide an improved formation workability. Moreover, all magnetic heads 11 opposite to the recording surfaces of the recording media 40 are supported individually by each of the holder arms 25. This allows the head support rigidity and the equivalent mass to be kept uniform, thereby making it possible to make uniform the vibration characteristics (frequency characteristics) of all the magnetic heads 11 and thus provide a sufficient accuracy of positioning the magnetic heads. Furthermore, even if resonance peaks appear in lower bands, the notch filter can be shared because of the uniform vibration characteristics (frequency characteristics) of all the magnetic heads 11. Thus, compared with the case where notch filters are prepared for each of the magnetic heads 11, the scale of the circuit can be reduced and the time of operation can be shortened.

Now, suppose that a magnetic head positioner assembly like the one shown in this embodiment is applied to a disk storage system in which three or more recording media are implemented. This can be realized by preparing an appropriate number of arm units to be combined, according to the number of recording media.

FIG. 16 is a side view showing a magnetic head positioner assembly according to a modified example of the first embodiment of the present invention. For example, consider a case where three recording media 40 are available as shown in FIG. 16. In this case, three arm units 21, 22, 23 having two holder arms 25 can be combined with one another. At this time, the movable coil 30 is held on the bobbin 26 provided to the arm unit 23 located at the middle portion of the stack. Even in this case, each of the three arm units 21, 22, 23 can be formed individually and then combined and bonded with one another to form the arm mechanism 20. Therefore, this embodiment provides a far more improved formation workability than the conventional example or the reference example employing the integrated arm 520 which would provide a more complicated shape than in the case where two recording media 40 are available and thus degrade the formation workability. In other words, this embodiment makes it possible to prevent the degradation in formation workability caused by an increase in number of the recording media 40.

Furthermore, the six magnetic head support members 10 opposite to the recording surface of each of the recording media 40 are supported individually by means of the six holder arms 25. This makes it possible to make uniform the vibration characteristics (frequency characteristics) of all the magnetic heads 11 and thus provide a sufficient accuracy of positioning the magnetic heads as in the case where two recording media 40 are available.

Here, like the case where two recording media 40 are available, each of the magnetic head support members 10 may be attached to each of the holder arms 25 in advance to allow the arm units 21, 22, 23 to be then combined and bonded with one another. The effect of improvement in workability of attachment of each of the magnetic head support members 10 to the reduced spacing portion of each of the holder arms 25 will become more pronounced than in the case where two recording media 40 are available.

Now, a second embodiment of the present invention will be explained with reference to FIGS. 17 to 23. This embodiment exemplifies a case where two recording media are available. However, this embodiment can also be applied in a similar manner to cases where three or more recording media are available. Incidentally, in the second embodiment shown in FIGS. 17 to 23, the same components as those of the first embodiment shown in FIGS. 7 to 11 bear the same reference symbols and are not explained in detail.

Figure 17:
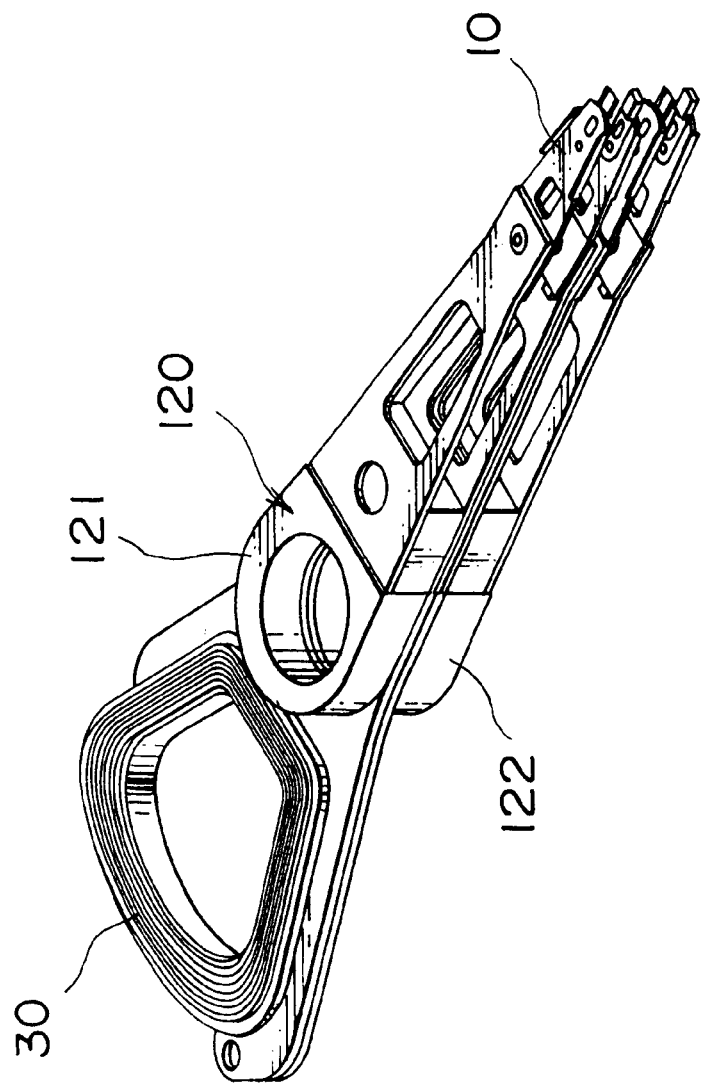
FIG. 17 is a perspective view showing a magnetic head positioner assembly according to a second embodiment of the present invention.

FIG. 17 is a perspective view showing a magnetic head positioner assembly according to this embodiment. As shown in FIG. 17, the magnetic head positioner assembly according to the present invention comprises four magnetic head support members 10, an arm 120 for supporting each of the magnetic head support members 10, and the movable coil 30 provided on the arm 120.

Moreover, like the conventional example and the first embodiment described above, this embodiment employs the VCM drive means for positioning the magnetic heads.

Figure 18:
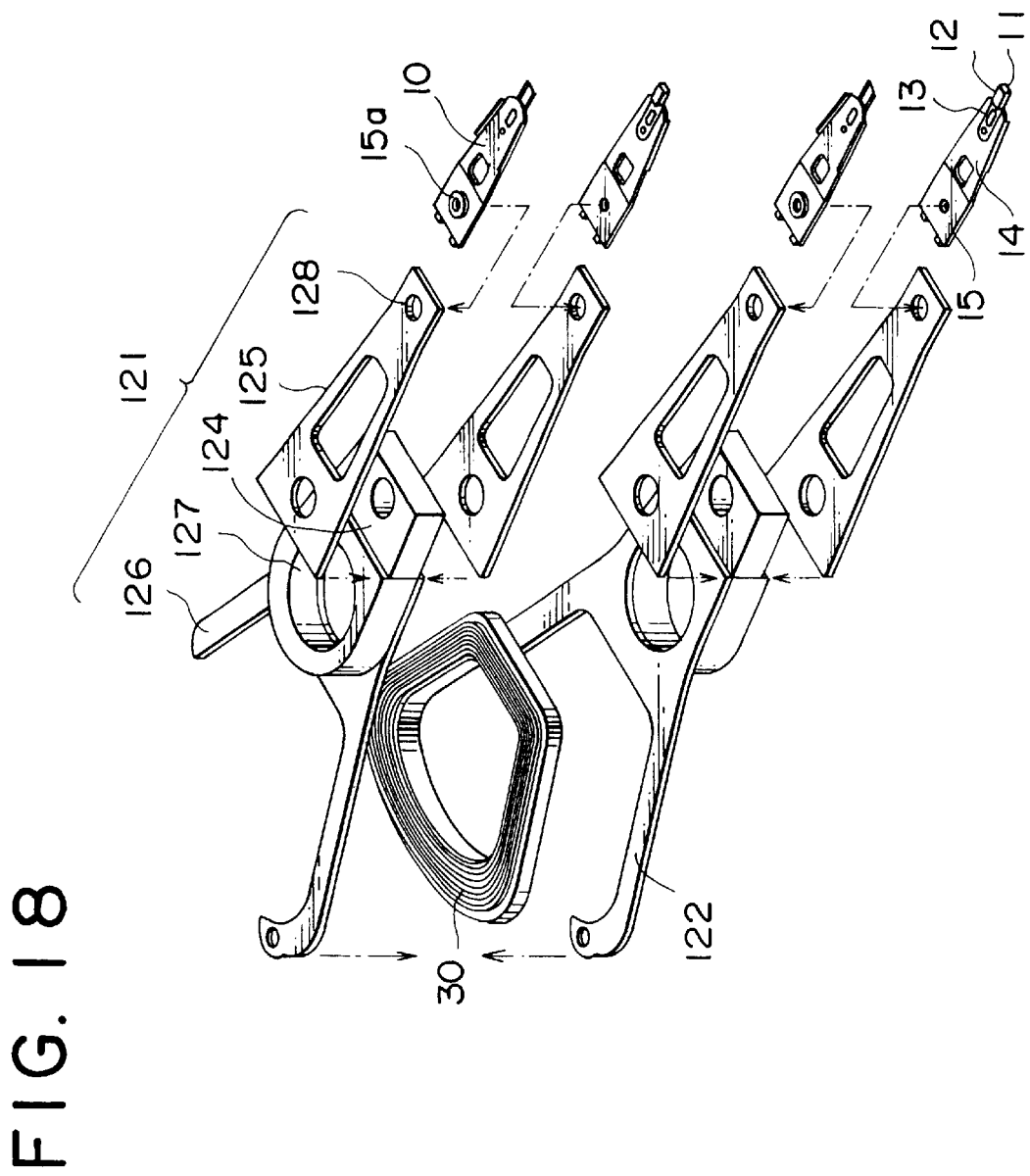
FIG. 18 is an exploded perspective view showing the magnetic head positioner assembly according to the second embodiment of the present invention.
Figure 19:
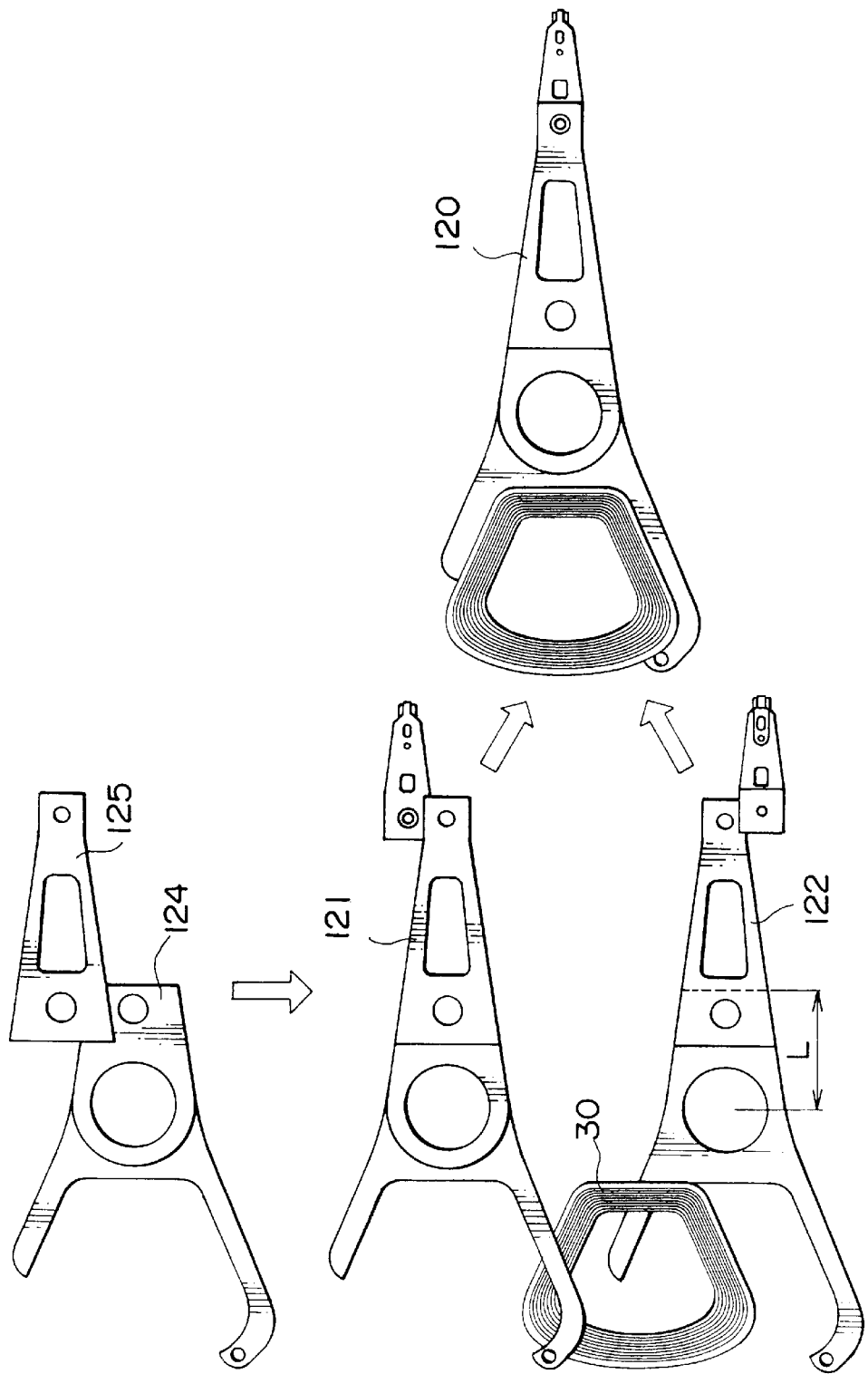
FIG. 19 is a plan view showing the magnetic head positioner assembly according to the second embodiment of the present invention.
Figure 20:
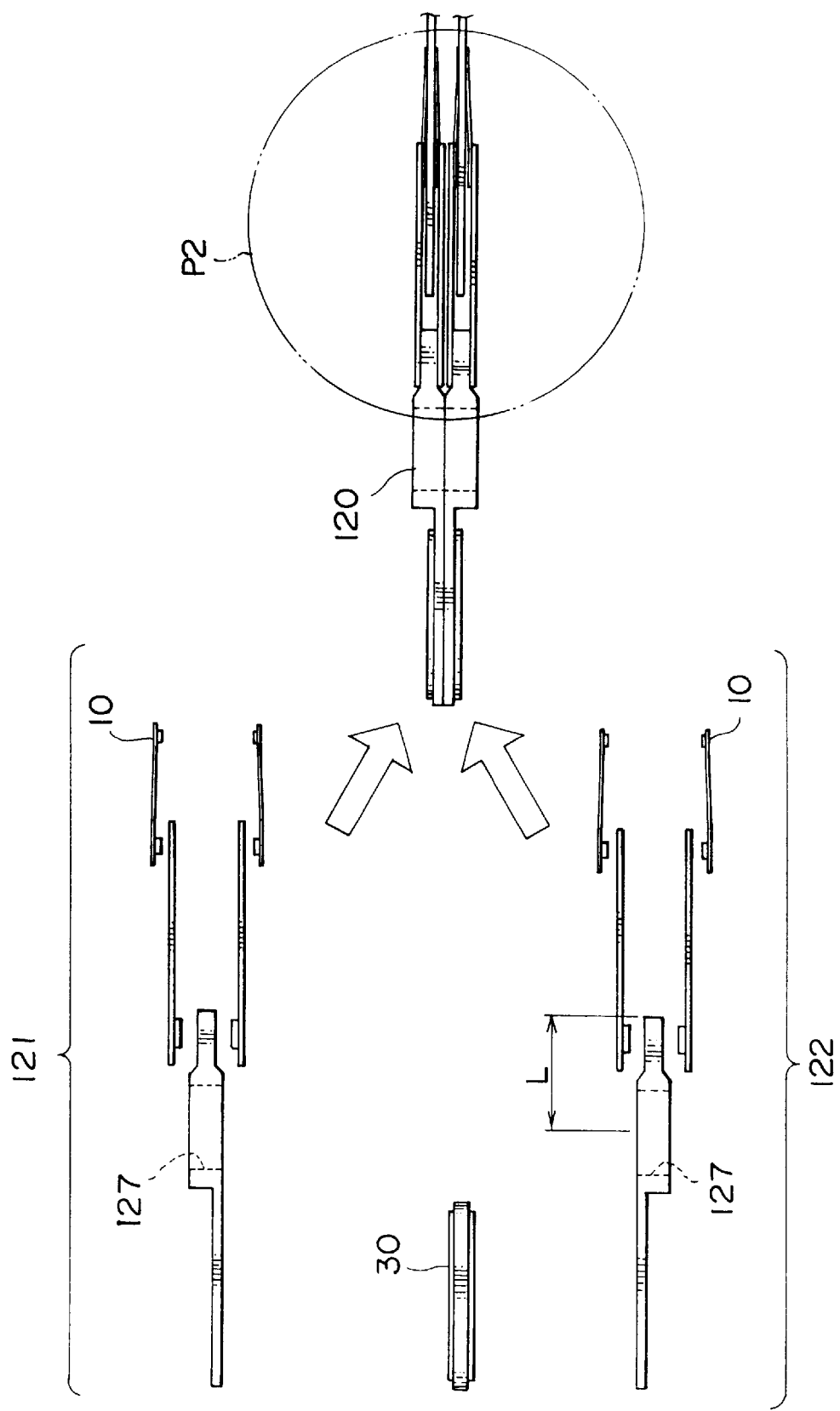
FIG. 20 is a side view showing the magnetic head positioner assembly according to the second embodiment of the present invention.

FIG. 18 is an exploded perspective view showing the arrangement of the magnetic head positioner assembly according to this embodiment. FIGS. 19 and 20 are plan and side views showing the magnetic head positioner assembly according to this embodiment, respectively. In addition, FIG. 21 is an enlarged side view showing the region P2 of FIG. 20.

As shown in FIGS. 18, 19, and 20, the arm 120 has arm units 121, 122 each comprising a rotatable bearing portion 127 provided with a bobbin 126 and an arm base 124, and two arm plates 125 (equivalent to the holder arms 25 of the first embodiment) formed of separate members, or thin plates, to be connected to the arm base 124. Moreover, the arm 120 is formed by the combination of the two arm units 121, 122, and the bobbins 126 provided for each rotatable bearing portion 127 are bonded with each other to sandwich the movable coil 30.

Figure 21:
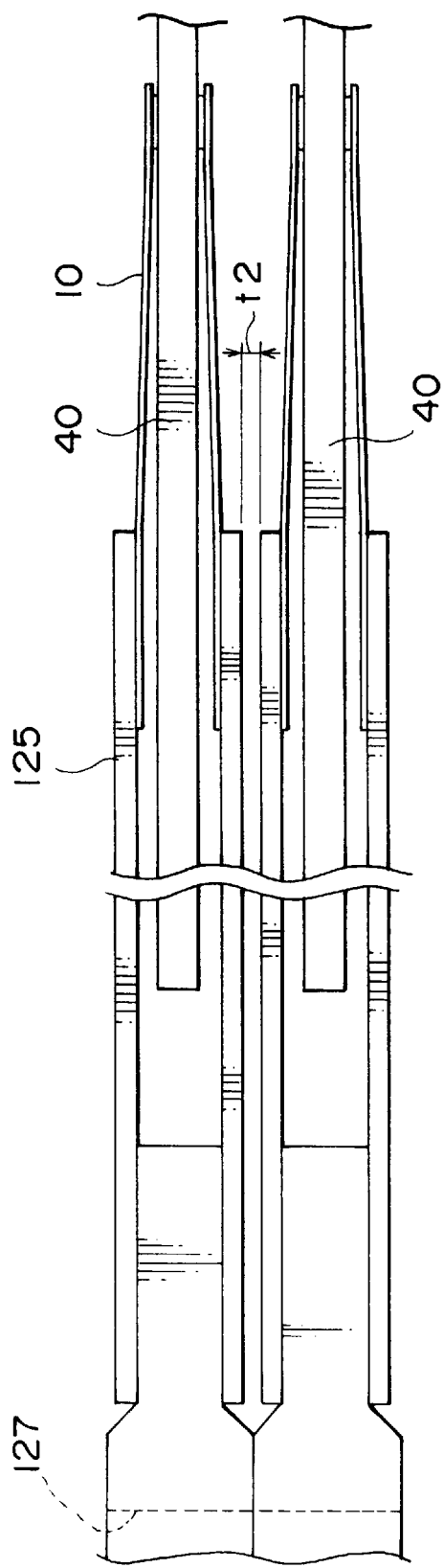
FIG. 21 is an enlarged side view showing the region P2 of FIG. 20.

At this time, it should be noted that the length L, shown in FIGS. 20 and 21, between the center of each rotatable bearing portion 127 to the edge portion of the arm base 124 on the side of the magnetic head 11 should be determined so as not to interfere with the recording media 40 when incorporated into the disk storage system. That is, it is preferable to make the length L as short as possible and arrange the edge portion of the arm base 124 closely to the outer periphery of the recording media 40 at the time of operation for service. This makes it possible to reduce the inertial weight of the arm 120 at the time of rotation and provide a reduction in size of the disk storage system.

Moreover, all the arm plates 125 are desirably made the same in shape.

Now, as shown in FIG. 18, each of the magnetic head support members 10 is provided with the same arrangement as that of the aforementioned conventional example and the first embodiment. Accordingly, each of the magnetic head support members 10 is individually fitted into a magnetic head support mounting hole 128 provided on each of the arm plates 125, via the boss 15*a* provided on the base plate 15.

Incidentally, the arm units 121, 122 may be fixed to each other and the movable coil 30 may also be held in accordance with the methods shown in the aforementioned first embodiment.

In addition, as shown in FIG. 21, the spacing between the arm plates 125 on the side of the bonded surface is advantageously made smaller for implementation between narrow plates when the arm units 121, 122 are bonded with each other. However, suppose that the magnetic head support members 10 each have to be held on the surface of the arm plates 125, opposite to that facing the recording surface of each of the associated recording media 40. In this case, the spacing is desirably made large enough for the magnetic head support members 10 not to interfere with each other. More specifically, it is desirable to provide a predetermined spacing of t2 for each of the base plates 15.

In addition, in the arm 520 of the aforementioned conventional example and the reference example, and each of the arm units 21, 22 of the first embodiment, the holder arms 525, 25 are each formed in one piece, for example, by cutting. For this reason, considering formation workability, each of the holder arms 525, 25 is formed of a low rigidity material such as aluminum. Therefore, this caused the holder arms 525, 25 with a low rigidity to turn to be a source of vibration at the time of operation of the magnetic head positioner assembly, thereby degrading the vibration characteristics at the position of the magnetic heads (that is, leading to a reduced position accuracy of the magnetic heads). Thus, this made it indispensable to make the thickness of each of the holder arms 525, 25 thicker in order to secure the rigidity of the magnetic head support members.

In contrast to this, this embodiment employs the arm plates 125 formed of separate members of a thin plate material instead of each of the holder arms 25 of the aforementioned first embodiment. This allows each of the arm plates 125 to be formed of a high rigidity material such as stainless steel. For this reason, while a high rigidity of each of the arm plates 125 is being maintained (more specifically, while the strength required at the time of implementation is being maintained), thin plates can be used to make the arm thinner. Furthermore, implementation between narrow spaced plates can be readily realized.

Now, the arm plates 125 each formed of stainless steel are explained. The stainless steel has a higher specific gravity than an aluminum alloy or the like. For this reason, it is necessary to make the stainless steel approximately one third the aluminum alloy in thickness in order to restrict the mass of the arm plates 125 within the order of the holder arms 525, 25 according to the reference example or the first embodiment. This naturally agrees with the aforementioned intention of making the plates thinner, however, in some cases, this would cause a degradation in rigidity of the arm plates 125 when made thinner. In such a case, as exemplified in FIGS. 22A to 22C, the arm plates 125 may be processed to be made higher in rigidity and lighter in weight.

Figure 22A:
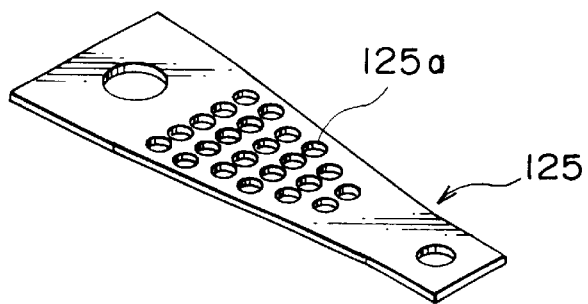
FIGS. 22A to 22C are views showing the second embodiment of the present invention, FIG. 22A being a perspective view thereof showing a plurality of through-holes provided on the arm plate portion, FIG. 22B being a perspective view thereof showing a recessed portion provided on the center portion of the arm plate portion, and FIG. 22C being a perspective view showing flanges provided on the both side portions of the arm plate portion.
Figure 22B:
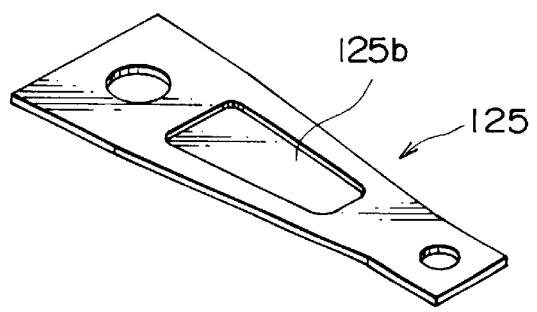
Figure 22C:
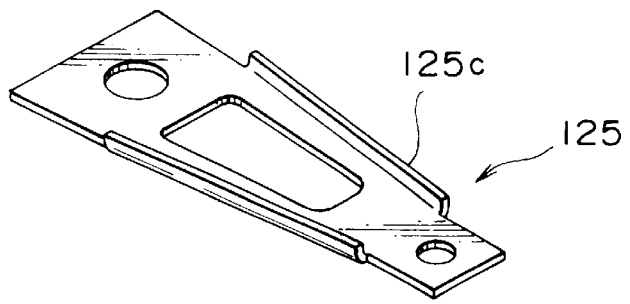

FIG. 22A is a perspective view showing the arm plate portion according to this embodiment provided with a plurality of through-holes. FIG. 22B is a perspective view showing the arm plate portion provided with a recessed portion at the central portion thereof. FIG. 22C is a perspective view showing the arm plate portion provided with flanges on the both sides thereof.

The arm plate 125 shown in FIG. 22A is reduced in weight by providing a number of small through-holes (weight reducing holes) 125*a* at portions except for the bonded portion between the arm base 124 and the magnetic head support member 10, while being prevented from decreasing in flexural rigidity and twist rigidity. Since the size and the rule of arrangement of the through-holes 125*a* depend on the strength required and workability of the arm plate 125, thus not being specified in particular here. However, the machining should be desirably performed so as to avoid extreme unevenness between the right and left sides about the central axis in the longitudinal direction. In addition, although not shown, one large through-hole (a weight reducing hole) may be employed so far as a decrease in strength (particularly, the twist rigidity) is within an allowable range of allowance of the strength required. This makes it possible to achieve a further reduction in weight without an increase in cost.

The arm plate 125 shown in FIG. 22B is adapted to decrease in weight while preventing a degradation in flexural rigidity or twist rigidity. The reduction in weight is carried out by performing half etching on the portions except for the bonded portion between the arm base 124 and the magnetic head support member 10, and the outer peripheral portion of the arm plate 125, thus forming a half etched portion 125*b* where the thickness of the arm plate 125 is made partially thinner.

The arm plate 125 shown in FIG. 22C is provided with an improved flexural rigidity and twist rigidity. This is done by performing flanging on the both sides in the longitudinal direction while the thickness of the arm plate 125 is being kept thin or made further thinner. FIG. 22C exemplifies double flanges 125*c* with each of the edges being upturned in the shape of a letter L. The shape of the flanges provided here depends on the strength required and workability of the arm plate 125 or the layout requirements to avoid interference with other parts when implemented. Moreover, the direction of upturn of the flanges, that is, whether to bend the flanges toward the recording surface of the associated recording medium depends on the aforementioned layout requirements. Accordingly, this is not specified in more detail here.

In addition, the arm plate 125 may be formed by combining the flanges shown in FIG. 22C with the through-holes shown in FIG. 22A, the half etched plate shown in FIG. 22B or the like. This makes it possible to achieve a higher rigidity and a reduction in weight at the same time in a more easier manner than by carrying out processing individually.

Figure 23:
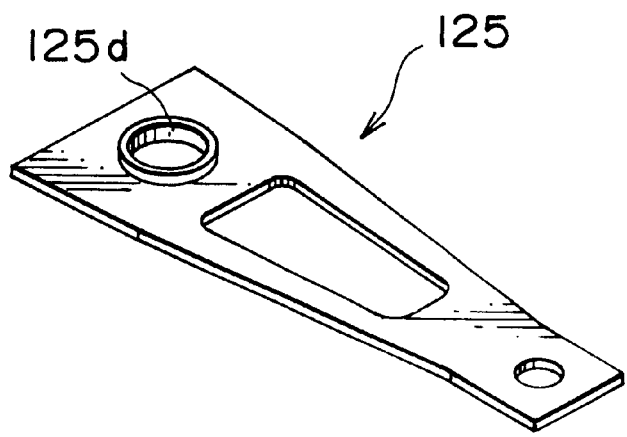
FIG. 23 is a perspective view showing an example of formation of the arm plate at the bonded portion with the arm base in the magnetic head positioner assembly according to the second embodiment of the present invention.

Now, a method for bonding the arm base 124 with each of the arm plates 125 will be explained below. FIG. 23 is a perspective view showing an example for processing the arm plate at a bonded portion thereof with the arm base to be used in the magnetic head positioner assembly according to this embodiment.

FIG. 23 illustrates the arm plate 125 provided with a boss 125*d*. Each of the arm plates 125 allows the boss 125*d* to be fitted into the mounting hole provided on the arm base 124 and caulked with a swage which is press fitted therein. This will facilitate the positioning of each of the arm plates 125 and make it possible to provide a sufficient bonding strength. Accordingly, even in a case of using adhesives for bonding the arm plates 125 with the arm base 124, the boss 125*d* will serve as a barrier to prevent the leakage of the adhesive to a positioner jig which is inserted into the mounting hole located on the side of the arm base 124, thereby providing an improved assembling workability (productivity).

The boss 125*d* may be integrated with the arm plates 125 by pressing or a boss member may be fitted into the arm plate 125. Alternatively, the boss may be provided on the side of the arm base 124. Moreover, the boss 125d may be provided for each of the arm plates 125 as well as any one of or a combination of the processing methods shown in FIGS. 22A to 22C may be employed at the same time. This would provide a further improved assembling workability to each of the arm plates 125 that have been made higher in rigidity and reduced in weight.

Furthermore, the magnetic head support members 10 may be attached to each of the arm plates 125 or to each of the arm plates 125 bonded to the arm base 124, and thereafter the arm units 121, 122 may be combined and bonded with each other. This makes it possible to improve the workability of incorporating each of the magnetic head support members 10 into the reduced spacing portion of each of the arm plates 125.

Like the aforementioned first embodiment, the magnetic head positioner assembly according to this embodiment configured as such makes it possible to improve the vibration characteristics by making the frequency characteristics of each of the magnetic heads 11 uniform. In addition to this effect, it is also made possible to provide a further improvement in vibration characteristics by increasing the rigidity and decreasing the weight of each of the arm plates 125, thereby providing a far better accuracy of positioning the heads. In addition, the holder arms are replaced with the arm plates 125 formed of separate thin plate members, thereby allowing implementation between reduced space plates. Furthermore, this embodiment provides a more improved yield because of less generation of cuttings or the like, when compared with arm units of the first embodiment where the holder arms are integrated, for example, by cutting.

Now, a third embodiment of the present invention will be explained with reference to FIGS. 24 and 26. This embodiment exemplifies a case where two recording media are available. However, this embodiment can also be applied in a similar manner to cases where three or more recording media are available.

Figure 24:
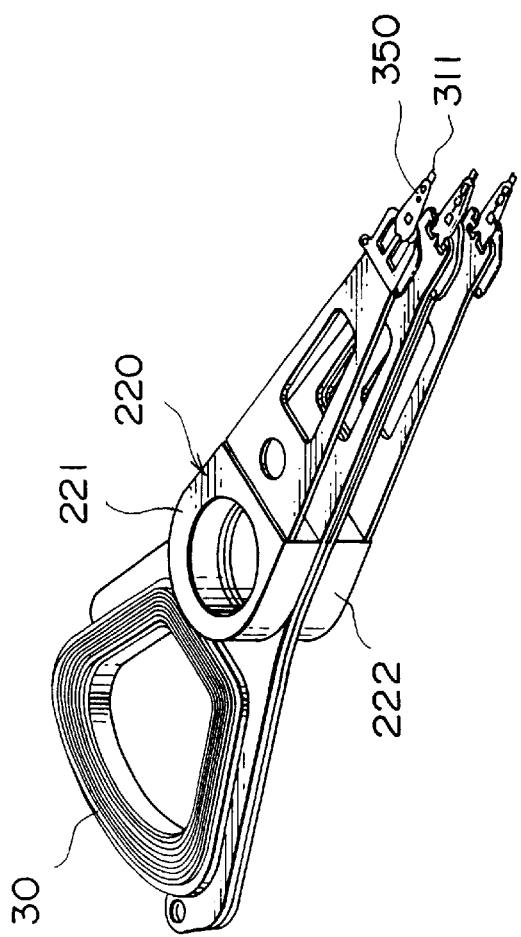
FIG. 24 is a perspective view showing a magnetic head positioner assembly according to a third embodiment of the present invention.

FIG. 24 is a perspective view showing a magnetic head positioner assembly according to the third embodiment of the present invention. As shown in FIG. 24, the magnetic head positioner assembly of the present invention comprises four fine actuators 350, an arm 220 for supporting each of the fine actuators 350, and the movable coil 30 provided to the arm 220.

In addition, the operation of positioning of the magnetic heads according to this embodiment is carried out by the VCM drive means for driving the arm 220 as in the aforementioned conventional example and the drive means employing the fine actuators 350, each of which drives individually each of magnetic heads 311 independently of the VCM drive means.

Figure 25:
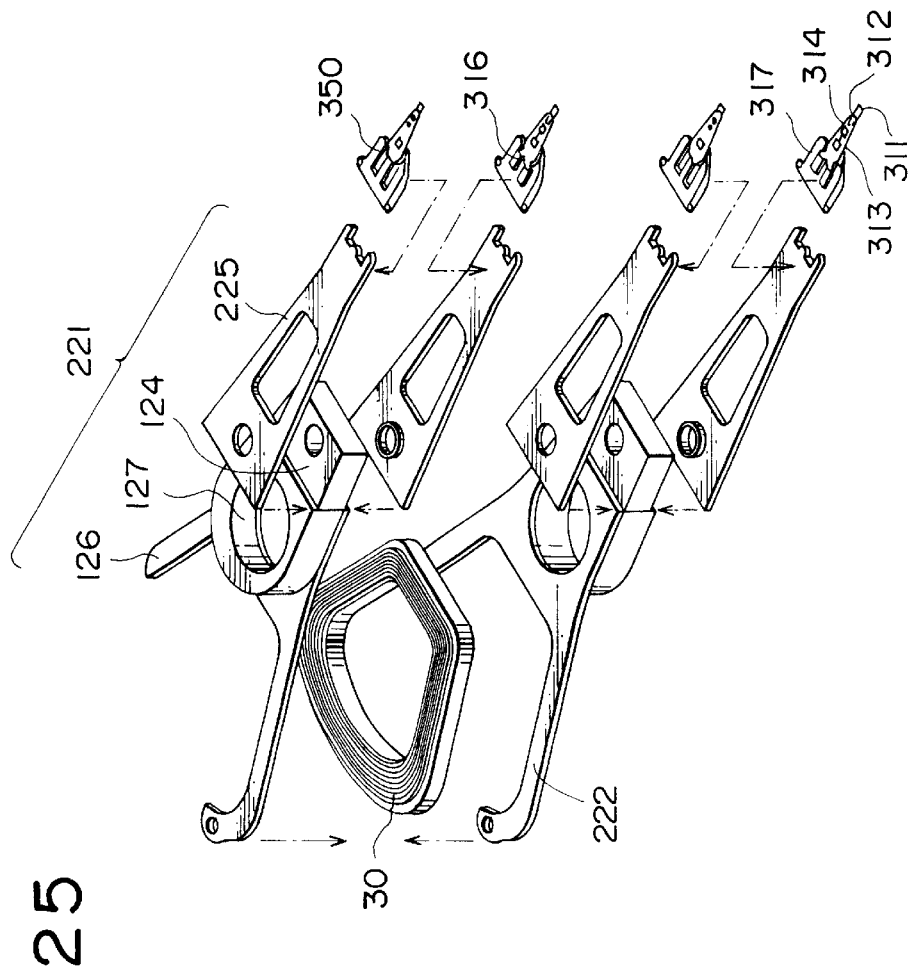
FIG. 25 is an exploded perspective view showing the magnetic head positioner assembly according to the third embodiment of the present invention.

FIG. 25 is an exploded perspective view showing the magnetic head positioner assembly according to this embodiment. As shown in FIG. 25, the arm 220 employs the same arrangement as that of the aforementioned second embodiment. The magnetic head support member 310 comprises a slider 312 of a floating or a contact type to which a magnetic head 311 is mounted, a gimbal spring 313 for supporting the slider 312, and a load beam 314 for providing a predetermined push load for the slider 312.

Figure 26A:
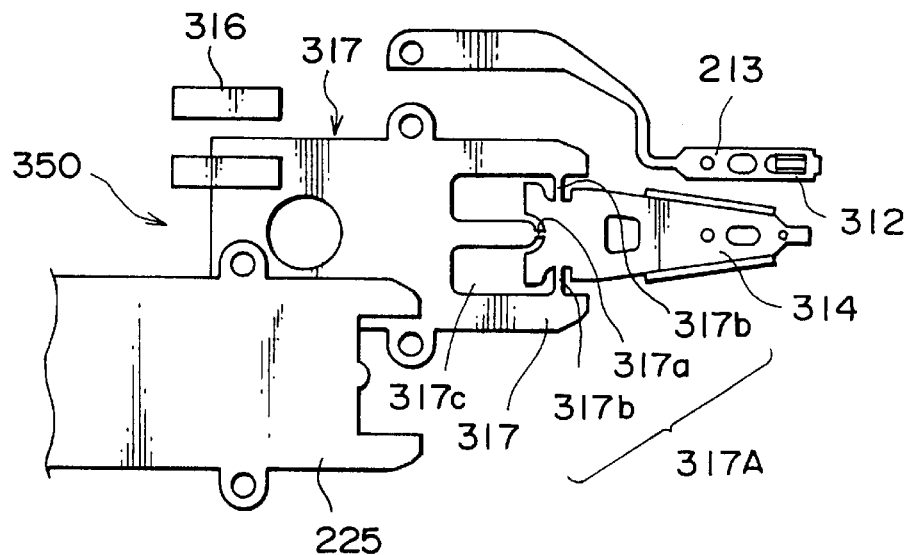
FIGS. 26A and 26B are views showing the fine actuator in the magnetic head positioner assembly according to the third embodiment of the present invention, FIG. 26A being a view showing the arrangement of the parts thereof and FIG. 26B being a perspective view showing the arrangement of the parts thereof.
Figure 26B:
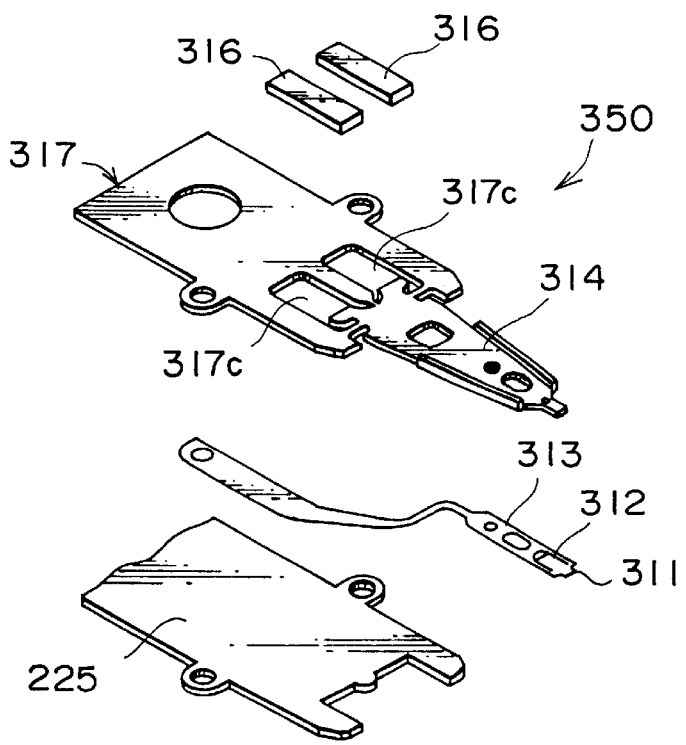

FIG. 26A is a view showing the arrangement of parts of the fine actuator for use with the magnetic head positioner assembly according to the third embodiment of the present invention, while FIG. 26B is a perspective view showing the arrangement of parts of the fine actuator of this embodiment.

In the arm 220, each of arm plates 225 employs the shape in accordance with the arm plates 125 of the aforementioned second embodiment, being different from the arm plates 125 in shape of an end portion. That is, as shown in FIGS. 26A and 26B, the arm plates 225 have the end portion which is bonded to each of the fine actuators 350 and overlaps an actuator spring 317 excluding a drive spring portion 317A comprising a center spring 317a and side springs 317b, 317b. In addition, the arm plates 225 are individually bonded with each of the fine actuators 350, for example, by laser spot welds at the proximal portion of the drive spring portion 317A or the portion shaped to allow overlap between the arm plate 225 and actuator spring 317.

Furthermore, as shown in FIG. 25, each of the fine actuators 350 employs a similar arrangement to the aforementioned reference example, being bonded individually to each of the arm plates 225. Moreover, in this embodiment, taking productivity into consideration, a load beam 314 and the actuator spring 317 are formed integrally of a piece of steel plate. However, the magnetic head support mechanism exemplified by the conventional example shown in FIG. 14 can also be used to be bonded to the actuator spring 517.

Incidentally, the arm units 121, 122 may be fixed to each other and the movable coil 30 may also be held in accordance with the methods exemplified by the aforementioned first embodiment.

In addition, each of the fine actuators 350 may be attached to each of the arm plates 225 in advance or to each of the arm plates 225 having been bonded to an arm base 224, and thereafter each of arm units 221, 222 may be combined and bonded with each other. This would make it possible to provide an improved workability of attaching each of the fine actuators 350 to reduced spacing portions between the arm plates 225.

The magnetic head positioner assembly according to the third embodiment arranged as such has a configuration in which the arm plates 225 reinforce the rigidity of the portion except for the surface of the fine actuators 350 or the drive spring portion 317A, thereby securing resistance to impacts or durability to loading/unloading. The processing of the arm plates 125 exemplified by the aforementioned second embodiment may be performed to provide a higher rigidity, reduced weight, and improved assembling workability for the arm plates 225. This would make it possible to provide a sufficient accuracy of positioning the heads in a more effective manner.

Incidentally, suppose that the first, second, and third embodiments are applied to a disk storage system in which a plurality of recording media 40 are implemented. For example, take a disk storage system in which an even number of recording media 40 are implemented. In this disk storage system, the arm may be constructed by arranging a pair of arm units, having the movable coil support portion applied to the case of the two recording media 40 exemplified by each of the embodiments, at the center of the arm and by uniformly combining at the both sides thereof an even number of arm units, each comprising a rotatable bearing portion and holder arms (or arm plates). The arm configured as such would allow a movable coil (that is, a drive force generating source) to be provided on a plane orthogonal to the axial direction at the position of the rotational axis center of the arm. This makes it possible to apply the drive force uniformly to each of the holder arms (or to each of the arm plates) and move each of the magnetic heads more positively in parallel to the surface of the recording media.

Furthermore, for example, take a disk storage system in which an odd number of recording media 40 are implemented. Like the case of the three recording media 40 exemplified by the first embodiment, the arm may be constructed by arranging an arm unit having the movable coil support portion at the center of the arm and by uniformly combining at the both sides thereof an even number of arm units, each comprising a rotatable bearing portion and holder arms (or arm plates). The arm configured as such would allow a movable coil (that is, a drive force generating source) to be provided on a plane orthogonal to the axial direction at the rotational axis center of the arm. Thus, this makes it possible to apply the drive force uniformly to each of the holder arms (or to each of the arm plates) and move each of the magnetic heads more positively in parallel to the surface of the recording media.

As described above, in the disk storage system in which a plurality of recording media are implemented, the magnetic head positioner assembly according to the present invention allows arm units each having two holder arms and prepared for each of the recording media to be combined and bonded with one another, thereby making it possible to form an arm. This thereby facilitates the formation of the arm when compared with the arm exemplified by the conventional example and the reference example, which is integrated with a plurality of holder arms and complicated in shape. In addition, the effect of improvement in formation workability will become more pronounced with increasing number of recording media. Furthermore, the magnetic heads are mounted individually to each of the holder arms. This makes uniform the support rigidity and the equivalent mass of the magnetic head support member at each of the magnetic heads, thereby making it possible to provide the same transfer characteristics (frequency characteristics) at the position of each of the magnetic heads. In addition, when compared with the conventional example and the reference example in which notch filters have to be prepared for each of the magnetic heads, the present invention allows a notch filter to be shared, thereby reducing the scale of the circuit and shortening the time for operation.

Furthermore, the holder arms are formed of arm plates of separate thin plates, and the arm plates are provided with through-holes, half-etched, and flanged, thereby making it possible to provide a high rigidity and a reduced weight to the arm at the same time.

Still furthermore, the arm plate is provided with a fine actuator for driving infinitesimally the magnetic head support member by means of a pair of piezoelectric devices, thereby making it possible to further improve the frequency characteristics at the position of the heads. This also makes it possible to provide good vibration characteristics at the position of the heads, while implementation between reduced spacing plates is being realized.

That is, it is made possible by the present invention to obtain an unprecedented good magnetic head positioner assembly which provides a sufficient accuracy of positioning the magnetic heads and improved productivity while providing a reduction in thickness, a high rigidity, and a decrease in weight.

What is claimed is:

1. A magnetic head positioner assembly comprising:
a plurality of magnetic head support members for individually supporting magnetic heads;
an arm comprising at least two arm units,
each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units; and
a movable coil provided to said arm,
wherein number of said arm units is two, and each of said arm units has a movable coil support portion to support said movable coil at a portion opposite to said holder arm with respect to said bearing portion.

2. A magnetic head Positioner assembly comprising:
a plurality of magnetic head support members for individually supporting magnetic heads;
an arm comprising at least two arm units,
each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units; and
a movable coil provided to said arm,
wherein there is an even number of said arm units, and a pair of said arm units each have a movable coil support portion to support said movable coil at a portion opposite to said holder arm with respect to said bearing portion.

3. A magnetic head positioner assembly comprising:
a plurality of magnetic head support members for individually supporting magnetic heads;
an arm comprising at least two arm units,
each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units; and
a movable coil provided to said arm,
wherein number of said arm units is an odd number, and one of said arm unit has a movable coil support portion to support said movable coil at a portion opposite to said holder arm with respect to said bearing portion.

4. A magnetic head positioner assembly comprising:
a plurality of magnetic head support members for individually supporting magnetic heads;
an arm comprising at least two arm units,
each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units;

a movable coil provided to said arm; and a plurality of fine actuators individually supported to each of said holder arm, each of said fine actuators comprising an actuator spring connected to said holder arm and a pair of piezoelectric devices for driving individually and infinitesimally said magnetic head support member, wherein number of said arm units is two, and each of said arm units has a movable coil support portion to support said movable coil at a portion opposite to said holder arm with respect to said bearing portion.

5. A magnetic head positioner assembly comprising:

a plurality of magnetic head support members for individually supporting magnetic heads;

an arm comprising at least two arm units, each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units;

a movable coil provided to said arm; and a plurality of fine actuators individually supported to each of said holder arm, each of said fine actuators comprising an actuator spring connected to said holder arm and a pair of piezoelectric devices for driving individually and infinitesimally said magnetic head support member, wherein there is an even number of said arm units, and a pair of said arm units each have a movable coil support portion to support said movable coil at a portion opposite to said holder arm with respect to said bearing portion.

6. A magnetic head positioner assembly comprising:

a plurality of magnetic head support members for individually supporting magnetic heads;

an arm comprising at least two arm units, each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units;

a movable coil provided to said arm; and a plurality of fine actuators individually supported to each of said holder arm, each of said fine actuators comprising an actuator spring connected to said holder arm and a pair of piezoelectric devices for driving individually and infinitesimally said magnetic head support member, wherein number of said arm units is an odd number, and one of said arm unit has a movable coil support portion to support said movable coil at a portion opposite to said holder arm with respect to said bearing portion.

7. A magnetic head positioner assembly comprising:

a plurality of magnetic head support members for individually supporting magnetic heads;

an arm comprising at least two arm units, each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units;

a movable coil provided to said arm; and a plurality of fine actuators individually supported to each of said holder arm, each of said fine actuators comprising an actuator spring connected to said holder arm and a pair of piezoelectric devices for driving individually and infinitesimally said magnetic head support member, wherein each of said holder arms is the same portion in shape as a proximal portion of each of said actuator springs, and each of said holder arms and each of said fine actuators are bonded with each other at the same portion in shape, and wherein number of said arm units is two, and each of said arm units has a movable coil support portion to support said movable coil at a portion opposite to said holder arm with respect to said bearing portion.

8. A magnetic head positioner assembly comprising:

a plurality of magnetic head support members for individually supporting magnetic heads;

an arm comprising at least two arm units, each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units;

a movable coil provided to said arm; and a plurality of fine actuators individually supported to each of said holder arm, each of said fine actuators comprising an actuator spring connected to said holder arm and a pair of piezoelectric devices for driving individually and infinitesimally said magnetic head support member, wherein each of said holder arms is the same portion in shape as a proximal portion of each of said actuator springs, and each of said holder arms and each of said fine actuators are bonded with each other at the same portion in shape, and wherein there is an even number of said arm units, and a pair of said arm units each have a movable coil support portion to support said movable coil at a portion opposite to said holder arm with respect to said bearing portion.

9. A magnetic head positioner assembly comprising:

a plurality of magnetic head support members for individually supporting magnetic heads;

an arm comprising at least two arm units, each of said arm units having two holder arms for individually supporting each of said magnetic head support members so as to position said magnetic head opposite to surface of recording media and a rotatable bearing portion for serving as a drive center of each of said holder arms, said arm units being combined and bonded with each other so as to align said bearing portion of all of arm units with each other and holding a space between neighboring holder arms of neighboring arm units;

a movable coil provided to said arm; and a plurality of fine actuators individually supported to each of said holder arm, each of said fine actuators comprising an actuator spring connected to said holder arm and a pair of piezoelectric devices for driving individually and infinitesimally said magnetic head support member, wherein each of said holder arms is the same portion in shape as a proximal portion of each of said actuator springs, and each of said holder arms and each of said fine actuators are bonded with each other at the same portion in shape, and wherein number of said arm units is an odd number, and one of said arm unit has a movable coil support portion to support said movable coil at a portion opposite to said holder arm with respect to said bearing portion.

* * * * *